United States Patent
Gisslén et al.

(10) Patent No.: US 12,157,063 B2
(45) Date of Patent: Dec. 3, 2024

(54) ADVERSARIAL REINFORCEMENT LEARNING FOR PROCEDURAL CONTENT GENERATION AND IMPROVED GENERALIZATION

(71) Applicant: Electronic Arts Inc., Redwood City, CA (US)

(72) Inventors: Linus Mathias Gisslén, Stockholm (SE); Andrew John Eakins, Guildford (GB)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 18/474,863

(22) Filed: Sep. 26, 2023

(65) Prior Publication Data

US 2024/0017175 A1 Jan. 18, 2024

Related U.S. Application Data

(63) Continuation of application No. 17/477,732, filed on Sep. 17, 2021, now Pat. No. 11,883,746.
(Continued)

(51) Int. Cl.
*A63F 13/56* (2014.01)
*A63F 13/57* (2014.01)
(Continued)

(52) U.S. Cl.
CPC ............. *A63F 13/67* (2014.09); *A63F 13/56* (2014.09); *G06N 3/045* (2023.01); *G06N 3/08* (2013.01)

(58) Field of Classification Search
CPC .......... A63F 13/67; A63F 13/56; A63F 13/60; A63F 13/65; A63F 13/63; A63F 13/69; G06N 3/08
See application file for complete search history.

(56) References Cited

U.S. PATENT DOCUMENTS

| 7,892,080 B1 * | 2/2011 | Dahl | .................. G07F 17/3288 463/10 |
| 9,679,258 B2 * | 6/2017 | Mnih | ..................... A63F 13/67 |

(Continued)

OTHER PUBLICATIONS

OpenAI, et al., "Dota 2 with Large Scale Deep Reinforcement Learning", www.arxiv.org, arXiv preprint arXiv:1912.06680, , 66 pages, dated Dec. 13, 2019.
(Continued)

*Primary Examiner* — David L Lewis
*Assistant Examiner* — Matthew D Hoel
(74) *Attorney, Agent, or Firm* — Gray Ice Higdon

(57) ABSTRACT

Methods, apparatus and systems are provided for training a first reinforcement-learning (RL) agent and a second RL agent coupled to a computer game environment using RL techniques. The first RL agent iteratively generates a sub-goal sequence in relation to an overall goal within the computer game environment, where the first RL agent generates a new sub-goal for the sub-goal sequence after a second RL agent, interacting with the computer game environment, successfully achieves a current sub-goal in the sub-goal sequence. The second RL agent iteratively interacts with the computer game environment to achieve the current sub-goal in which each iterative interaction includes an attempt by the second RL agent for interacting with the computer game environment to achieve the current sub-goal. The first RL agent is updated using a first reward issued when the second RL agent successfully achieves the current sub-goal. The second RL agent is updated when a second reward is issued by the computer game environment based on the performance of the second RL agent attempting to achieve said current sub-goal. Once validly trained, the first RL agent forms a final first RL agent for automatic procedural content generation (PCG) in the computer game envi-
(Continued)

ronment and the second RL agent forms a final second RL agent for automatically interacting with a PCG computer game environment.

20 Claims, 14 Drawing Sheets

Related U.S. Application Data

(60) Provisional application No. 63/152,704, filed on Feb. 23, 2021.

(51) Int. Cl.
*A63F 13/67* (2014.01)
*G06N 3/045* (2023.01)
*G06N 3/08* (2023.01)

(56) References Cited

U.S. PATENT DOCUMENTS

| | | | | |
|---|---|---|---|---|
| 10,445,641 B2* | 10/2019 | Srinivasan | | G06N 3/047 |
| 10,679,613 B2* | 6/2020 | Wabgaonkar | | G10L 15/16 |
| 10,762,424 B2* | 9/2020 | Nazari | | G06F 17/18 |
| 10,781,910 B2* | 9/2020 | Dalum | | F16N 29/00 |
| 10,792,993 B2* | 10/2020 | Dalum | | B60K 6/42 |
| 10,866,588 B2* | 12/2020 | Buch | | G05D 1/0285 |
| 10,891,534 B2* | 1/2021 | Dasgupta | | G06N 3/088 |
| 10,935,982 B2* | 3/2021 | Yao | | B60W 40/12 |
| 10,963,313 B2* | 3/2021 | Nag | | G06N 20/00 |
| 10,970,649 B2* | 4/2021 | Nag | | G06N 7/01 |
| 11,049,008 B2* | 6/2021 | Mnih | | A63F 13/67 |
| 11,074,829 B2* | 7/2021 | Zhang | | G09B 7/04 |
| 11,077,842 B2* | 8/2021 | Dalum | | B60K 6/442 |
| 11,080,623 B2* | 8/2021 | Nag | | G06N 5/02 |
| 11,095,528 B2* | 8/2021 | Kundu | | H04L 67/10 |
| 11,106,738 B2* | 8/2021 | Osogami | | G06F 16/9027 |
| 11,150,670 B2* | 10/2021 | Khosla | | G05D 1/0088 |
| 11,170,293 B2* | 11/2021 | Gao | | G06N 3/08 |
| 11,225,240 B2* | 1/2022 | Dalum | | B60K 25/02 |
| 11,341,539 B2* | 5/2022 | Ram | | G06N 20/00 |
| 11,366,599 B2* | 6/2022 | Yoo | | G06F 3/0619 |
| 11,397,888 B2* | 7/2022 | Wabgaonkar | | G06N 3/084 |
| 11,410,558 B2* | 8/2022 | Ganti | | G06N 5/04 |
| 11,417,235 B2* | 8/2022 | Zhang | | G09B 5/125 |
| 11,429,890 B2* | 8/2022 | Singh | | G06N 20/00 |
| 11,461,162 B2* | 10/2022 | Chen | | G06N 5/04 |
| 11,463,961 B2* | 10/2022 | Gupta | | H04W 52/281 |
| 11,488,024 B1* | 11/2022 | Regan | | G06N 3/045 |
| 11,494,162 B2* | 11/2022 | Kim | | G06F 4/162 |
| 11,504,626 B2* | 11/2022 | Kaku | | A63F 13/67 |
| 11,526,729 B2* | 12/2022 | Tatsubori | | G06N 3/08 |
| 11,568,236 B2* | 1/2023 | Yu | | G06N 3/006 |
| 11,628,562 B2* | 4/2023 | Hutter | | G05B 17/02 |
| | | | | 700/250 |
| 11,636,427 B2* | 4/2023 | Zhang | | G06Q 10/08 |
| | | | | 705/28 |
| 2010/0094788 A1* | 4/2010 | Schafer | | G05B 13/027 |
| | | | | 700/29 |
| 2010/0205974 A1* | 8/2010 | Schneegass | | G05B 13/027 |
| | | | | 700/48 |
| 2013/0013543 A1* | 1/2013 | Dull | | G05B 13/027 |
| | | | | 706/25 |
| 2013/0176146 A1* | 7/2013 | Dusparic | | G08G 1/07 |
| | | | | 340/907 |
| 2013/0178952 A1* | 7/2013 | Wersborg | | G06F 18/21355 |
| | | | | 700/47 |
| 2013/0204812 A1* | 8/2013 | Sterzing | | G06N 20/00 |
| | | | | 706/12 |
| 2014/0180989 A1* | 6/2014 | Krizhevsky | | G06T 1/20 |
| | | | | 706/31 |
| 2015/0100530 A1* | 4/2015 | Mnih | | A63F 13/67 |
| | | | | 706/25 |
| 2015/0102945 A1* | 4/2015 | El-Tantawy | | G08G 1/081 |
| | | | | 340/909 |
| 2015/0110597 A1* | 4/2015 | Dull | | G05B 13/0265 |
| | | | | 415/13 |
| 2017/0278018 A1* | 9/2017 | Mnih | | G06N 3/006 |
| 2019/0381404 A1* | 12/2019 | Buttner | | G06T 13/00 |
| 2021/0365782 A1* | 11/2021 | Huang | | A63F 13/335 |
| 2021/0374538 A1* | 12/2021 | Mnih | | G06N 3/006 |
| 2022/0150148 A1* | 5/2022 | Cappello | | B60W 30/18009 |

OTHER PUBLICATIONS

Shao, et al., "A survey of deep reinforcement learning in video games," www.arxiv.org, arXiv preprint arXiv:1912.10944, 13 pages, dated Dec. 26, 2019.
Packer, et al., "Assessing generalization in deep reinforcement learning," www.arxiv.org, arXiv preprint arXiv:1810.12282,, 17 pages, dated Mar. 15, 2019.
Connor, et al., "Evaluating the impact of procedurally generated content on game immersion," The Computer Games Journal, vol. 6, No. 4, pp. 209-225,, 14 pages, dated 2017.
Ling, et al., "Using deep convolutional neural networks to detect rendered glitches in video games," in Proceedings of the AAAI Conference on Artificial Intelligence and Interactive Digital Entertainment, vol. 16, No. 1,, pp. 66-73, 8 pages, dated 2020.
Harmer et al.,, "Imitation learning with concurrent actions in 3d games," in 2018 IEEE Conference on Computational Intelligence and Games (CIG), www.arxiv.org, pp. 1-8, 8 pages, dated Sep. 6, 2018.
Zheng, et al., "Wuji: Automatic online combat game testing using evolutionary deep reinforcement learning," in 2019 34th IEEE/ACM International Conference on Automated Software Engineering (ASE) IEEE, pp. 772-784, 16 pages, dated Nov. 2019.
Bergdahl, et al., "Augmenting automated game testing with deep reinforcement learning," in 2020 IEEE Conference on Games (CoG), IEEE, www.arxiv.org, pp. 600-603, 4 pages, dated Mar. 29, 2021.
Risi, et al., "Increasing generality in machine learning through procedural content generation," Nature Machine Intelligence, www.arxiv.org, pp. 1-9, 14 pages, dated Mar. 16, 2020.
Khalifa, et al., "Pcgrl: Procedural content generation via reinforcement learning," www.arxiv.org, arXiv preprint arXiv:2001.09212,7 pages, dated 2020.
Bontrager et al., "Fully differentiable procedural content generation through generative playing networks," www.arxiv.org, arXiv preprint arXiv:2002.05259, 10 pages, dated Feb. 12, 2020.
Wang, et al., "Paired openended trailblazer (poet): Endlessly generating increasingly complex and diverse learning environments and their solutions," www.arxiv.org, arXiv preprint arXiv:1901.01753, 28 pages, dated Feb. 21, 2019.
Portelas, et al., "Teacher algorithms for curriculum learning of deep rl in continuously parameterized environments," in Conference on Robot Learning. PMLR, pp. 835-853, 19 pages, dated 2020.
Uther et al., "Adversarial reinforcement learning," Carnegie Mellon University. 22 pages, dated Apr. 24, 1997.
Pinto et al.,, "Robust adversarial reinforcement learning," 34th International Conference on Machine Learning, 10 pages, dated 2017.
Jaderberg, et al., "Reinforcement learning with unsupervised auxiliary tasks," www.arxiv.org, arXiv preprint arXiv:1611.05397, 14 pages, dated Nov. 16, 2016.
Justesen, et al., "Illuminating generalization in deep reinforcement learning through procedural level generation," www.arxiv.org, arXiv preprint arXiv: 1806.10729, 10 pages, dated Nov. 26, 2018.
Goodfellow, et al. "Generative adversarial networks," University of Montreal, 11 pages, dated 2014.
Summerville, et al. "Procedural content generation via machine learning (pcgml)," www.arxiv.org, IEEE Transactions on Games, vol. 10, No. 3, pp. 257-270, 15 pages, dated May 7, 2018.
Juliani, et al. "Unity: A general platform for intelligent agents," www.arxiv.org, arXiv preprint arXiv:1809.02627, 28 pages, dated May 6, 2020.

(56) References Cited

OTHER PUBLICATIONS

Littman, et al., "A generalized reinforcement-learning model: Convergence and applications," in ICML, vol. 96. Citeseer, pp. 310-318, 18 pages, dated Feb. 1996.

* cited by examiner

| Aux. value | Fixed | Rule PCG | ARL PCG |
|---|---|---|---|
| 1 (Easy) | 0.301±0.154 (21.9±0.7 m/s) | 0.987±0.154 (23.0±0.4) | 1.000±0.000 (21.8±0.5 m/s) |
| 0 (Moderate) | 0.044±0.048 (19.0±0.7 m/s) | 0.979±0.035 (20.6±1.1 m/s) | 0.972±0.029 (19.6±0.5 m/s) |
| -0.5 (Hard) | 0.013±0.037 (16.6±1.2 m/s) | 0.804±0.303 (15.1±2.4 m/s) | 0.781±0.172 (16.6±1.1 m/s) |
| -0.75 | 0.005±0.008 (15.6±1.03 m/s) | 0.485±0.402 (13.9±2.0 m/s) | 0.436±0.234 (15.4±1.0 m/s) |
| -1 (Hardest) | 0.000±0.010 (14.7±0.7 m/s) | 0.228±0.339 (12.6±1.8 m/s) | 0.206±0.157 (14.9±0.6 m/s) |

FIG. 9

| Aux. value | Fixed | Rule PCG | ARL PCG |
|---|---|---|---|
| 1 (Easy) | 0.0±0.0 | 0.776±0.154 | 0.824±0.185 |
| 0.5 | 0.0±0.0 | 0.692±0.350 | 0.741±0.285 |
| 0 (Moderate) | 0.0±0.0 | 0.386±0.235 | 0.728±0.284 |
| -0.5 (Hard) | 0.0±0.0 | 0.148±0.165 | 0.360±0.276 |
| -0.75 | 0.0±0.0 | 0.081±0.125 | 0.353±0.222 |
| -1 (Hardest) | 0.0±0.0 | 0.053±0.037 | 0.183±0.139 |

FIG. 10

| | Platform Game | Racing Game |
|---|---|---|
| Fixed track | 0.081±0.205, 0.200 (54 steps) | 0.022±0.021 (16.5 m/s) |
| Rule PCG | 0.233±0.200, 0.950 (451 steps) | 0.139±0.165 (17.1 m/s) |
| Fixed aux. | 0.173±0.195, 0.900 (442 steps) | 0.072±0.082 (15.7 m/s) |
| ARL PCG | 0.457±0.211, 1.000 (467 steps) | 0.271±0.137 (18.6 m/s) |

ADVERSARIAL REINFORCEMENT LEARNING FOR PROCEDURAL CONTENT GENERATION AND IMPROVED GENERALIZATION

TECHNICAL FIELD

The present application relates to apparatus, systems and method(s) for using adversarial reinforcement-learning (RL) techniques to train a first RL agent to perform procedural content generation (PCG) for a computer game environment of a video game and train a second RL agent with improved generalization for interacting with a generated PCG computer game environment.

BACKGROUND

Training RL agents for interacting with unseen environments is a notoriously difficult task. This is particularly so for computer game environments of video games. Typically, trained RL player or solver agents are used to imitate a player character or a non-player character (e.g. an adversary to a player character) within the computer game environment of a video game. One popular approach is to procedurally generate different computer game environments in order to increase the generalizability of such trained RL agents. While existing RL approaches have been very successful at creating RL player agents that can solve problems in computer game environments and/or interacting with said computer game environments to achieve one or more goals with "super-human" performance, such RL player agents lack generalizability in part because their training and validation sets are often the same.

Typically, these RL agents are trained on such specific computer game environments that they become "overfitted". That is, there is a problem with these RL agents in that they have essentially "memorized" only those computer game environments on which they have been trained. They are then unable to generalize well or adapt to new or previously unseen computer game environments. The difficulty in training RL agents that are generalizable is due, in part, to the designer of a video game being unable to create enough diverse training datasets, i.e. different computer game environments. Although scripting may assist a designer in creating different procedural content generated (PCG) computer game environments, but the resulting training datasets are still very limited and resulting RL agents still overfitted.

This makes RL agents trained based on such training datasets less useful in game development and/or during game play, where the computer game environment including the assets, non-player characters, and/or other player characters and the like etc. may change or adapt on a day-to-day basis or in real-time. For example, in the computer game environment said assets, NPCs and/or other player characters and the like may also include artificial intelligence aspects resulting in different and unknown future behaviours. Most computer game environments are now continually changing or adapting. Trained RL agents that are overfitted are typically unable to cope due to the adapting computer game environment. Such trained RL agents also are less useful for handling automated in-game content-creation and/or testing.

There is a desire for a methodology, apparatus, systems and/or an architecture capable of generating a multitude of diverse PCG computer game environments whilst at the same time training RL player/solver agents on ever-changing computer game environments whilst ensuring such trained RL player/solver agents are more generalizable, adaptable and useful in unseen scenarios and/or computer game environments.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

The present disclosure provides method(s), apparatus and system(s) for performing procedural content generation (PCG) for computer game environments and automatically interacting with said PCG computer game environments using adversarial deep reinforcement-learning (RL) techniques for training a first RL agent (a so-called Generator) for generating a PCG computer game environment, and training at least one second RL agent (a so-called Solver) for interacting with the PCG computer game environment and solving/traversing sub-goals and/or overall goals within said PCG computer game environment. During training, the Generator receives a first reward signal based on the performance of the Solver which encourages the computer game environment design to be challenging but not impossible, whilst the Solver receives a second reward signal based on its performance interacting in the computer game environment designed and generated by the Generator. This provides the advantages of the Solver achieving better generalization through the generated challenges from the Generator, whilst the Generator is able to better create diverse PCG computer game environments that are playable/solvable by the Solver. The resulting trained first RL agent is configured for generating PCG computer game environments and the resulting trained second RL agent is configured to interacting PCG computer game environments for assisting game designers in robustly testing PCG computer game environments.

As an option, to further drive diversity, generalisability and control of the computer game environment generation by the Generator and/or interaction by the Solver, one or more auxiliary diversity input signals may be applied to the reward function of the Generator and/or computer game environment, which causes the Generator to generate previously unseen computer game environments using the auxiliary diversity input signal as a control variable by a game designer. This may provide the further advantages of the Solver achieving enhanced generalization through the generated challenges from the Generator based on the value of the auxiliary diversity input signal, whilst the Generator is further enhanced in creating PCG computer game environments with even more diversity that are playable/solvable by the enhanced Solver.

According to a first aspect of this specification, there is disclosed a computer-implemented method for training a first reinforcement-learning (RL) agent and a second RL agent coupled to a computer game environment using RL techniques, the computer-implemented method comprising: iteratively generating, by the first RL agent, a sub-goal sequence in relation to an overall goal within the computer game environment, based on: generating a new sub-goal for the sub-goal sequence after a second RL agent, interacting with the computer game environment, successfully achieves a current sub-goal in the sub-goal sequence; and updating the first RL agent using a first reward issued when the second RL agent successfully achieves the current sub-goal. The computer-implemented method further comprising: iteratively interacting, by the second RL agent, with the computer game environment to achieve the current sub-goal based on: performing one or more actions, by the second RL agent, in the computer game environment to achieve the current sub-goal; and updating the second RL agent using a second reward issued by the computer game environment based on the performance of the second RL agent attempting to achieve said current sub-goal. Once the first and second RL agents are validly trained, outputting a final first RL agent for automatic PCG in the computer game environment, and a final second RL agent for automatically interacting with a PCG computer game environment.

The method may further comprise applying the auxiliary diversity signal to the reward function of the first RL agent, the reward function of the first RL agent comprising a combination of an external reward and an internal reward, the external reward based on the first reward and the internal reward based on the auxiliary diversity signal and the performance of the first RL agent in generating said sub-goals for achieving the overall goal in the computer game environment.

The method may further comprise, freezing the state of the second RL agent whilst the first RL agent iteratively generates said sequence of sub-goals in the computer game environment for the frozen second RL agent to interact with and updating the first RL agent further comprising updating the state of the first RL agent based on a first reward issued when the frozen second RL agent successfully achieves the current sub-goal or times out in multiple attempts at achieving the current sub-goal, wherein said first reward is based on the performance of the frozen second RL agent attempting to achieve the current sub-goal.

The method may further comprise, freezing the state of the first RL agent whilst the second RL agent iteratively interacts with the computer game environment in relation to each sub-goal iteratively generated by the frozen first RL agent, wherein updating the second RL agent further comprising updating the state of the second RL agent based on one or more second rewards, each second reward issued by the computer game environment in relation to the performance of each attempt the second RL agent makes when interacting with the computer game environment to achieve the current sub-goal.

According to a second aspect of this specification, there is disclosed a generator RL apparatus for procedural content generation in a computer game environment of a video game, the apparatus including one or more processors and a memory, the memory comprising instructions that, when executed by the one or more processors, cause the apparatus to perform operations comprising: iteratively generating, using a trained generator RL agent trained using a reinforcement learning technique, each sub-goal in a sub-goal sequence within the computer game environment, the sub-goal sequence configured for meeting an overall goal in the computer game environment, wherein a trained solver RL agent or player interacts with the computer game environment in an attempt to achieve a current sub-goal in the sub-goal sequence and, when the trained solver RL agent or player successfully achieves the current sub-goal in the sub-goal sequence, the trained generator RL agent generates a new sub-goal for the sub-goal sequence until the overall goal is achieved by the trained solver RL agent or player; and updating the computer game environment based on each generated sub-goal for use by the trained solver RL agent or player.

According to a third aspect of this specification, there is disclosed a system for training a first RL agent and a second RL agent coupled to a computer game environment of a video game, the system comprising: a generation module for configuring a first RL agent to iteratively generate a sub-goal sequence in relation to an overall goal within the computer game environment, wherein the first RL agent module generates a new sub-goal for the sub-goal sequence after a second RL agent, interacting with the computer game environment, successfully achieves a current sub-goal in the sub-goal sequence; and an interaction module for configuring a second RL agent to iteratively interact with the computer game environment to achieve the current sub-goal, wherein each iterative interaction comprises an attempt by the second RL agent for interacting with the computer game environment to achieve the current sub-goal; a first update module for updating the first RL agent using a first reward issued when the second RL agent successfully achieves the current sub-goal; a second update module for updating the second RL agent using a second reward issued by the computer game environment based on the performance of the second RL agent attempting to achieve said current sub-goal; and an output module for outputting, once the first and second RL agents are validly trained, a final first RL agent for automatic procedural content generation, PCG, in the computer game environment, and a final second RL agent for automatically interacting with a PCG computer game environment.

According to a fourth aspect of this specification, there is disclosed a solver RL apparatus for interacting with a procedural content generated (PCG) computer game environment of a video game, the apparatus including one or more processors and a memory, the memory comprising instructions that, when executed by the one or more processors, cause the apparatus to perform operations comprising: iteratively interacting, using a trained solver or player RL agent trained using a reinforcement learning technique, with each sub-goal in a sub-goal sequence within the PCG computer game environment, the sub-goal sequence configured for meeting an overall goal in the computer game environment, wherein each sub-goal in the sub-goal sequence is generated by a trained generator RL agent in which the computer game environment is updated accordingly, and the solver RL agent or player interacting with the sub-goals in the computer game environment in an attempt to achieve a current sub-goal in the sub-goal sequence and, when the trained solver RL agent or player successfully achieves the current sub-goal in the sub-goal sequence, the trained generator RL agent generates a new sub-goal for the sub-goal sequence until the overall goal is achieved by the trained solver RL agent or player.

According to a fifth aspect of this specification, there is disclosed a generator RL apparatus for automatically generating a procedurally content generated computer game environment for a video game, the apparatus comprising a processor, a memory unit and a communication interface, wherein the processor is connected to the memory unit and the communication interface, wherein processor and memory are configured to implement a generator RL agent trained based on the computer-implemented method according to the first aspect.

According to a sixth aspect of this specification, there is disclosed a solver RL apparatus for automatically interacting with a procedurally content generated computer game environment of a video game, the apparatus comprising a processor, a memory unit and a communication interface, wherein the processor is connected to the memory unit and the communication interface, wherein processor and memory are configured to implement a solver RL agent or player agent trained based on the computer-implemented method according to the first aspect.

According to a seventh aspect of this specification, there is disclosed a non-transitory tangible computer-readable medium comprising data or instruction code for training a first RL agent and a second RL agent coupled to a computer game environment of a video game, which when executed on one or more processor(s), causes at least one of the one or more processor(s) to perform at least one of the steps of the method of: training, using RL techniques, a first RL agent for generating one or more portions of a computer game environment and a second RL agent for interacting with the one or more generated portions of the computer game environment, said training comprising: updating the first RL agent based on a first reward associated with the second RL agent successfully interacting with the generated portions of the computer game environment; and updating the second RL agent based on one or more second reward(s) received from the computer game environment associated with the performance of second RL agent iteratively interacting with the generated portions of the computer game environment; and outputting, when validly trained, a final first RL agent for automatic PCG of a computer game environment, and a final second RL agent for automatically interacting with a PCG computer game environment.

According to an eighth aspect of this specification, there is disclosed a non-transitory tangible computer-readable medium comprising data or instruction code for training a first RL agent and a second RL agent coupled to a computer game environment of a video game, which when executed on one or more processor(s), causes at least one of the one or more processor(s) to perform at least one or more of the steps of the computer-implemented method according to the first aspect.

BRIEF DESCRIPTION OF THE DRAWINGS

Embodiments of the invention will be described, by way of example, with reference to the following drawings, in which:

FIG. 9 illustrates an example performance table in relation to differently trained Solver agents on unseen Racing computer game environments generated by a trained Generator according to some embodiments of the invention;

FIG. 10 illustrates an example performance table in relation to differently trained Solver agents on unseen FPS Platform computer game environments generated by a trained Generator according to some embodiments of the invention;

FIG. 11 illustrates another example table for comparing the performance of differently trained Solver agents on unseen FPS Platform/Racing computer game environments generated by a trained Generator according to some embodiments of the invention.

Figure 1A:
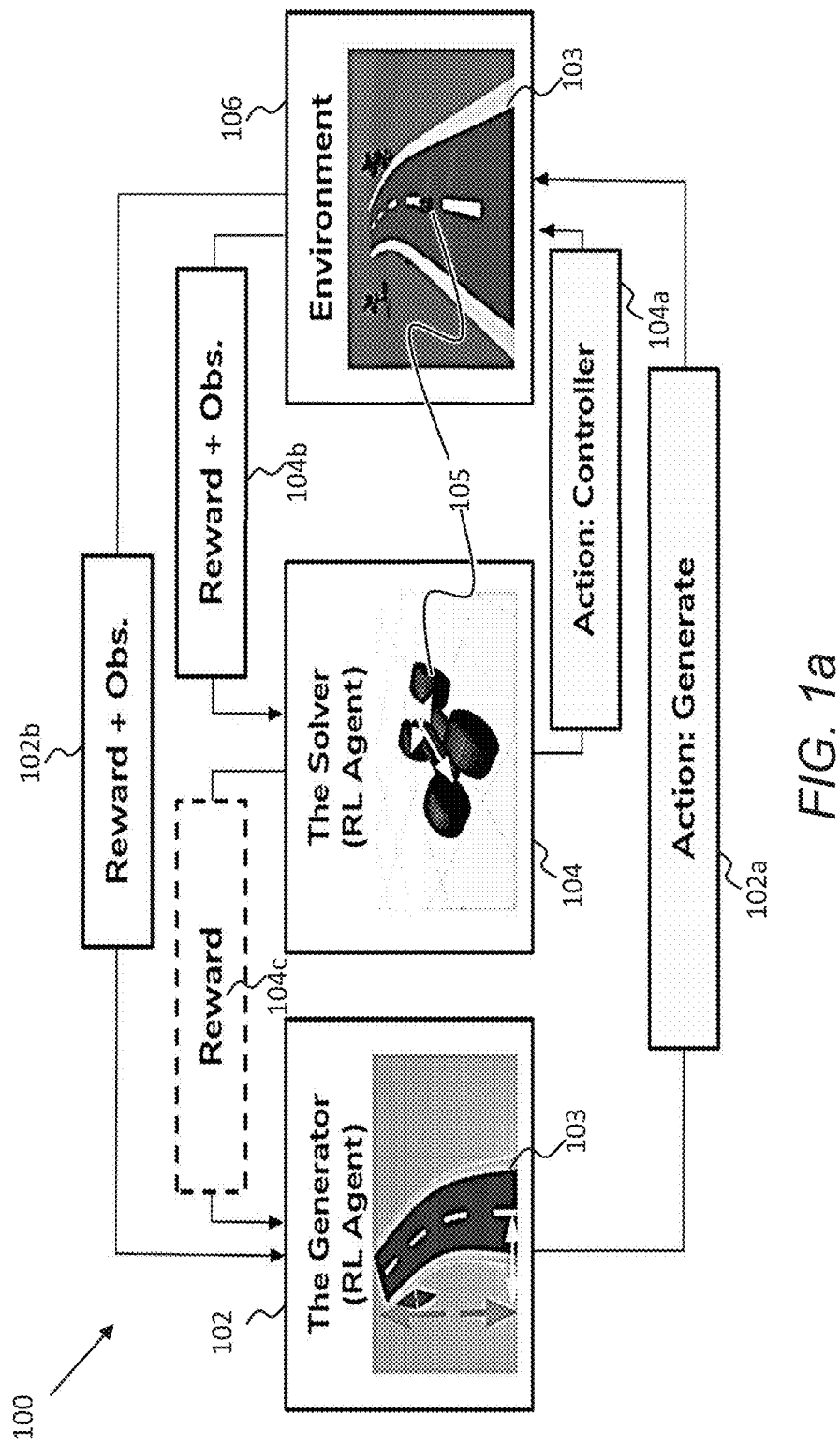
FIG. 1a illustrates an example adversarial RL training system for training a first RL agent and a second RL agent in a computer game environment of a video game according to some embodiments of the invention.

Common reference numerals are used throughout the figures to indicate similar features.

DETAILED DESCRIPTION

FIG. 1a illustrates an example adversarial RL training system 100 for training a first RL agent 102 and a second RL agent 104 in a computer game environment 106 of a video game. The first RL agent 102 is trained to generate game environment data 103 for updating the computer game environment 106 of the video game. The computer game environment 106 may be any type of computer game environment such as, without limitation, for example a two-dimensional and/or a three-dimensional game environment. The generated game environment data 103 is associated with one or more sub-goals of an overall goal set by the first RL agent 102 (also referred to herein as a so-called Generator or Generator RL agent), where the second RL agent 104 (also referred to herein as a so-called Solver or Solver RL agent) interacts with the updated computer game environment 106 for achieving said one or more sub-goals and/or the overall goal. The second RL agent 104 is trained to interact with the updated computer game environment 106 in relation the generated environment data 103 of the computer game environment 106 to achieve said one or more sub-goals and/or the overall goal. Once trained, the resulting first and second RL agents 102 and 104 of the adversarial RL system 100 may be used for procedural content generation (PCG) of the computer game environment 106 and automatically interacting with PCG computer game environments, respectively.

The Generator and Solver RL agents 102 and 104 co-exist as adversarial agents where the Generator 102 creates a game environment data 103 (e.g. racing tracks, platforms, paths, etc.) associated with one or more sub-goals of an overall goal (e.g. completing the racing track, traversing a set of platforms or paths, etc.) for a computer game environment 106 which the Solver 104 is tasked to solve/traverse to achieve said one or more sub-goals of the overall goal. The Solver 104 may provide feedback 102b (or direct 102c) to the Generator 102 in the form of observations and rewards 102b via the computer game environment 106 (or directly via optional reward 102c). In response, the Generator 102 challenges the Solver 104 by creating an adapted problem such as new sub-goals of the overall goal. This way the system 100 is symbiotic as without the Solver 104 the Generator 102 would not be able to create game environment data 103 for the computer game environment 106 that is "playable" (or solvable by a player or user), and the Solver 104 without the Generator 102 would not be able to generalize or adapt well over unseen computer game environments. The use-cases for this adversarial RL system 100 includes: 1) Training a first RL agent (e.g. Generator) 102 to make the second RL agent 104 (e.g. Solver) fail, which makes the second RL agent (e.g. Solver) 104 more robust; and 2) The first RL agent 102 (e.g. Generator) can be used to generate new game environment data 103 and hence creating new computer game environments 106 which are shown to be traversable or solvable and the like by the second RL agent 104 (e.g. Solver) and hence by a user or player (if traversed by the Solver).

The adversarial RL system 100 uses adversarial deep RL techniques for training the first RL agent 102 (also referred to herein as a so-called Generator or Generator RL agent) for generating game environment data 103 for a PCG computer game environment 106, and for training at least one second RL agent 104 (also referred to herein as a so-called Solver/Player or Solver/Player RL agent) for interacting with the PCG computer game environment 106 for solving/traversing the sub-goals and/or overall goals associated with the game environment data 103 generated by the Generator RL agent 102 for said PCG computer game environment 106. The sub-goals and/or overall goals are set by the Generator RL agent 102 when generating computer game environment data 103 for said PCG computer game environment 104.

For example, game environment data 103 associated with one or more sub-goals in the computer game environment 106 may include data representative of one or more objects within the computer game environment 106 to be interacted with by the second RL agent 104 in the computer game environment 106. In another example, game environment data 103 associated with one or more sub-goals may include data representative of a segment of a track or path within the computer game environment 106 to be traversed by the second RL agent 104 in the computer game environment 106. In another example, game environment data 103 associated with one or more sub-goals in the computer game environment 106 may include data representative of a section or portion of the computer game environment to be solved or traversed by the second RL agent 102 in the computer game environment 106. In essence, the game environment data 103 generated by the Generator RL agent 102 includes any type of game environment data that is used to modify or update the computer game environment 106 to cause the Solver RL agent 104 to interact with the computer game environment 106 and successfully achieve one or more sub-goals and/or an overall goal associated with the generated game environment data 103.

The first RL agent/Generator RL agent 102 may be any RL agent suitable for generating game environment data 103 for setting one or more sub-goals and/or overall goals within the computer game environment 106 for achieving by a second RL agent/Solver RL agent 104 during its interactions with the computer game environment 106. The first RL agent/Generator RL agent 102 is capable of being trained using reinforcement learning techniques. For example, the Generator RL agent 102 may be based on any of: a policy function; an actor-critic model; or a Q-function. The Generator RL agent may be implemented by, without limitation, for example a Feed Forward neural network (FFNN), Long Short-term memory (LSTM) model or Gated Recurrent Unit (GRU) based artificial neural network (ANN), such as a recurrent neural network (RNN). Many other alternatives will be apparent to those skilled in the art.

The second RL agent/Solver RL agent 104 may be any RL agent suitable for controlling the actions 104a of a playable character 105 or object, non-playable character or object, or other interactive object 105 in a computer game environment in which the Solver RL agent 104 is capable of being trained using reinforcement learning techniques. For example, the Solver RL agent 104 may be based on any of: a policy function; an actor-critic model; or a Q-function. The Solver RL agent 104 may be implemented by, without limitation, for example a Feed Forward neural network (FFNN), a Long Short-term memory (LSTM) model or Gated Recurrent Unit (GRU) based artificial neural network (ANN), such as a recurrent neural network (RNN). Many other alternatives will be apparent to those skilled in the art.

For example, the first and second RL agents may each include a neural network with at least two interconnected layers in which each layer includes a plurality of neural units connected together. Each neural network may be a feed forward neural network. The RL technique used for training and updating the state of the neural networks of the first and second RL agents may be based on one or more proximal policy optimisation algorithms and the like.

The first RL agent/Generator RL agent 102 is configured to create and output actions 102a corresponding to generated game environment data 103 in response to receiving a first reward 102b associated with the performance of the second RL agent/Solver agent 104 interacting with the computer game environment 104 when attempting to achieve said one or more sub-goals or the overall goal. The output actions 102a are used to update the computer game environment 106. The first Generator RL agent 102 may also receive game environment data observations associated with the Solver RL agent 104 interactions with the computer game environment 106. The first RL agent/Generator RL agent 102 outputs the actions 102a of generated game environment data 103 associated with a new sub-goal for updating the computer game environment 106 and causing the second RL agent 104 associated with a player character 105 and the like in the computer game environment 106 to perform one or more further actions 104a controlling the player character 105 and the like to achieve the new sub-goal.

The second RL agent/Solver RL agent 104 is configured to create and outputs actions 104a for controlling a player character 105 to the computer game environment 106 in response to receiving a second reward 104b and game environment observations from the computer game environment 106 based on previous output actions 104a. The output actions 104a enables the second RL agent 104 to control a player character 105 and the like in the computer game environment to achieve or attempt to achieve the current sub-goal, one or more sub-goals, and/or the overall goal set by the Generator RL agent 102. The Solver RL agent 104 receives the second reward 104b based on the performance of the Solver agent 104 in achieving the current sub-goal when interacting via the player character 105 with the computer game environment 104. The output actions 104a are used to control the actions of a player character 105 in the computer game environment 106.

The interactions of the Solver RL agent 104 is governed by a set of actions for controlling a player character 105 and the like in the computer game environment 106. For example, this may enable the Solver RL agent 104 to control the player character 105 to solve one or more portions of the computer game environment 106 to achieve the current sub-goal. In another example, this may enable the Solver RL agent to control the player character and the like 105 to traverse the computer game environment 106 to achieve the current sub-goal. As another example, the set of actions may be output as player action data 104a for causing a player character 105 in the computer game environment 106 to perform the one or more actions associated with the player action data 104a and achieve or attempt to achieve the current sub-goal.

The Generator 102 receives a reward from a Generator reward function that is based on an internal generator reward and an external generator reward. The external generator reward may be received as the first reward 102b from the computer game environment 106 and/or, as an option, received as a first reward 102c from the Solver 104. The internal generator reward is dependent on the actions of the Generator 102. The external generator reward 102b is tied to the performance of the Solver when interacting with the computer game environment 106 for achieving the one or more sub-goals and/or overall goal set by the game environment data 103 created by the Generator 102. The Generator reward function is mainly based on the performance on progression and failure but it can be set differently depending on the desired behaviour of the Generator 102. In order to train a Generator 102 to create a challenging environment there is always a balance to strike between trivial and impossible computer game environments 106. The Generator reward function is configured and designed to mainly drive between two extremes in relation to progress and behaviour. At one extreme, the Generator 102 should generate game environments 103 that help the Solver 104 reach the sub-goals and/or overall goal (e.g. progress), and on the other extreme, the Generator 102 should actively try to make the Solver 104 behave "sub-optimally" (i.e. any deviation from the fastest-path to goal could be considered sub-optimal, but this is also where the behaviour is manifested).

The Solver 104 also receives a reward from a Solver reward function that is based on an internal solver reward and an external solver reward. The external solver reward may be received as the second reward 104b from the computer game environment 106. The internal solver reward is dependent on the actions of the Solver 104. The external solver reward 104b is tied to the performance of the Solver when interacting with the computer game environment 106 for achieving the one or more sub-goals and/or overall goal set by the game environment data 103 created by the Generator 102. Generally, the Solver reward function for the Solver contains a progressive reward, plus a negative for failing. The negative reward for failing is important to have as it stops the Solver 104 from generating actions that control the player character 105 for taking too "big a risk" and consequently forcing the Generator 102 to create game environment data 103 that is not impossible.

During training of the adversarial RL system 100, the Generator 102 receives a first reward signal 102b from the computer game environment 106 based on the performance of the Solver 104 interacting with the computer game environment 106 which encourages the design of computer game environment 106 to be challenging, but not impossible, whilst the Solver 104 receives a second reward signal 104b based on its performance interacting in the computer game environment 106 designed and generated by the Generator 102. This provides the advantages of the Solver 104 achieving better generalization through a plethora of generated challenges from the Generator 102, whilst the Generator 102 is able to better create game environment data 103 for diverse PCG computer game environments that are playable/solvable by the Solver 104. The resulting trained first RL agent or Generator 102 is configured for generating PCG computer game environments 106 and the resulting trained second RL agent or Solver 104 is configured for interacting with PCG computer game environments. As an option, such a trained Generator 102 and Solver 104 can be used for assisting game designers in robustly designing and testing PCG computer game environments.

Figure 1B:
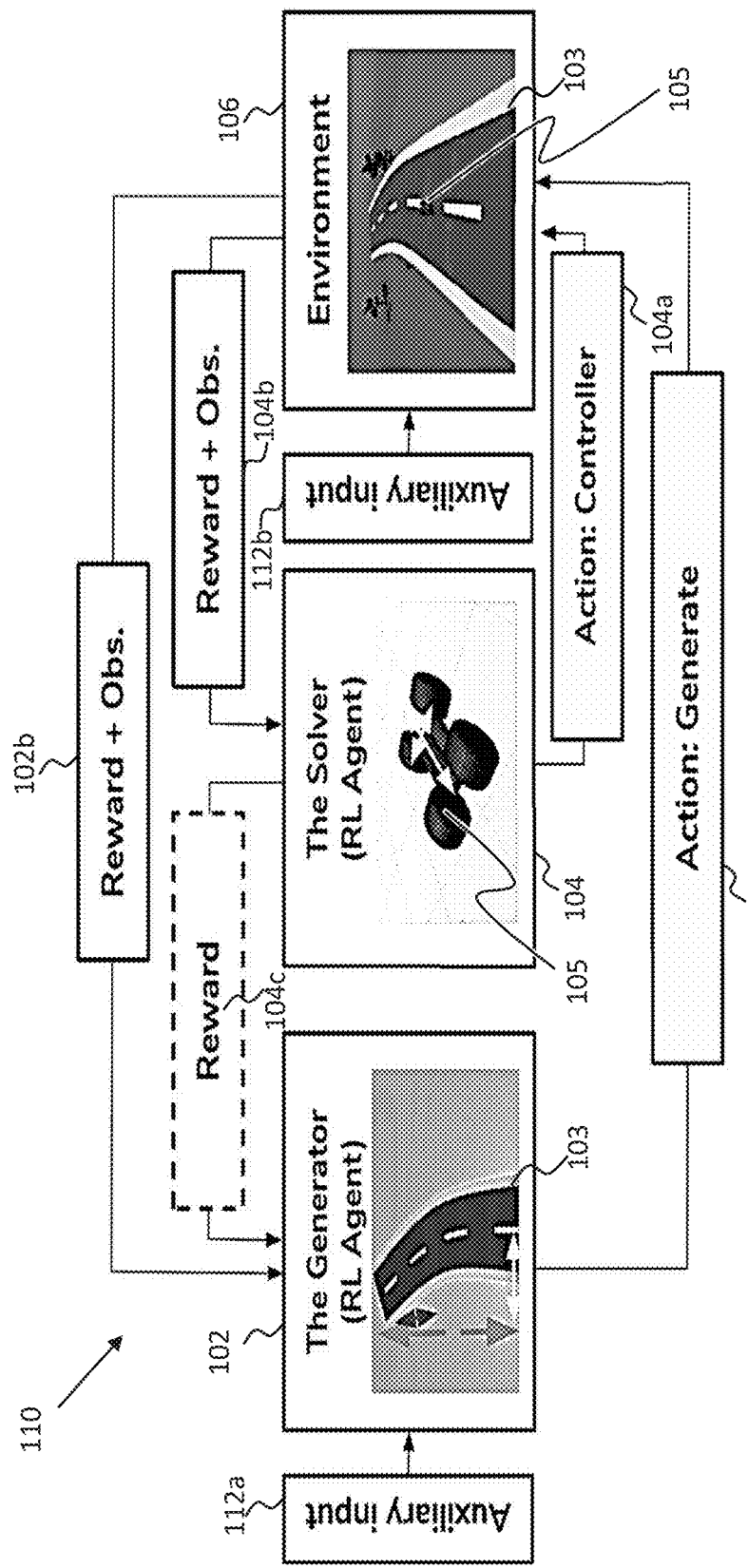
FIG. 1b illustrates another example adversarial RL training system based on the adversarial RL training system of FIG. 1a according to some embodiments of the invention.

FIG. 1b illustrates another example adversarial RL training system 110 based on the adversarial RL training system 100 of FIG. 1a. The adversarial RL training system 110 is configured for training the first RL agent/Generator 102 and second RL agent/Solver 104 in the computer game environment 106 of a video game. The adversarial RL training system 110 has modified the adversarial RL training system 100 by including auxiliary diversity input signals 112a and 112b, which are input to the Generator 102 and the computer game environment 106. The auxiliary diversity input signals 112a and 112b are coupled to the Generator reward function of the Generator 102 and to the reward function of the computer environment 106, respectively. The reward function of the computer environment 106 is used to generate the first reward 102b (or by the Solver when generating reward 102c). As the auxiliary input signals 112a and 112b are connected to the Generator reward function and the reward function of the computer game environment 106 associated with the Generator 102, they are used as a training enhancer and can also be used to indirectly control the game environment data 103 output of the trained Generator 102 (also referred to as a Generator model).

Generally, when training the Generator 102 there is a balance to be struck between impossible and trivial computer game environments 106, the auxiliary diversity input signals 112a and 112b enables this balance to be controlled externally by a game designer and/or user. In addition, training an adversary RL based Generator 102 against a RL based Solver agent 104 may lead to convergence to the optimal utility function for both Generator and Solver agents 102 and 104. This may be undesirable because: 1) the solutions may lead to low generalization ability for the Solver 104, and the Generator 102 then allows for little control. Thus, with the auxiliary diversity input signal 112a and 112b connected to the Generator network and the computer game environment 106, the difficulty and/or diversity of the Generator 102 may be controlled, which also results in trained Solver agents 104 that are generalizable.

The auxiliary diversity input signal 112a is used to control the Generator reward function in such a way that the output of the Generator 102 may be controlled indirectly. In this manner, the Solver 104 is confronted with varying difficulty and behaviour (controlled by auxiliary diversity input signal 112a to the Generator 102) which increases its generalization ability to solve previously unseen computer game environments. The output behaviour of the Generator 102 changes when the auxiliary diversity input signal 112a (and 112b) is changed.

The auxiliary diversity input signal 112a is applied to the Generator reward function of the Generator 102. As previously described, the Generator reward function of the Generator is a combination of an external generator reward and an internal generator reward. The external generator reward is based on the first reward 102b from the computer game environment 106 (or optionally from the Solver 104 via reward 102c). The internal generator reward is based on the auxiliary diversity signal 112a and the performance of the Generator 102 in generating said game environment data 103 and corresponding sub-goals for achieving the overall goal in the computer game environment 106.

The auxiliary diversity input signals 112a and 112b are used to further drive diversity, generalizability and control of the generation of game environment data 103 for updating the computer game environment 106. The connection of the auxiliary diversity input signals 112a and 112b to the corresponding reward functions causes the Generator 102 to generate game environment data 103 that results in previously unseen computer game environments. A game designer may use the auxiliary diversity input signals 112a and 112b as a control variable to control the difficulty and/or diversity of the Generator's output 103.

The auxiliary diversity input signals 112a and 112b have the same value. The auxiliary diversity signals 112a and 112b may each have the same value within a range between a negative auxiliary threshold value and a positive auxiliary threshold value (ATH). For example, auxiliary diversity signals 112a and 112b may be assigned the same value within the range of [−1, 1].

An example Generator reward function with auxiliary scaling may be based on:

$$r = r_i \lambda_{A_i} \alpha + r_e \lambda_{A_i} \beta,$$

where $\lambda_{A_i} \in [-1; 1]$ is fed in as input to the network in the form of an observation, $r_i/r_e$ is the internal/external generator rewards, and $\lambda_{A_i}$ is the auxiliary diversity input signal 112a, with $\alpha$; $\beta$ being weighting factors. Although the auxiliary input diversity signal 112a is described as being $\lambda_{A_i} \in [-1; 1]$, this is by way of example only, the skilled person would appreciate that $\lambda_{A_i} \in [-ATH; ATH]$, where ATH may be an auxiliary threshold value (ATH), which may be a non-zero real value or integer greater than zero.

The adversarial RL training system 110 provides the advantage of training a Generator 102 and/or creating a trained Generator 102 that is capable of providing training data to a Solver 104 that enables the Solver 104 to handle all/most environments produced by the Generator 102 and all/most environments authored by a human (e.g., game developer, player). The adversarial RL training system 110 also provides the advantage of creating a trained Generator 102 that can assist game designers in creating environments that could be controlled and quantified by designed metrics by adjusting the auxiliary diversity input signals 112a and/or 112b (e.g. such as varying the difficulty and/or diversity of the computer game environment 106). The adversarial RL training system 110 also provides the advantage of creating a trained Solver 104 that is adaptable and/or generalizable enough to assist game designers to test unseen computer game environments in real-time production.

Figure 1C:
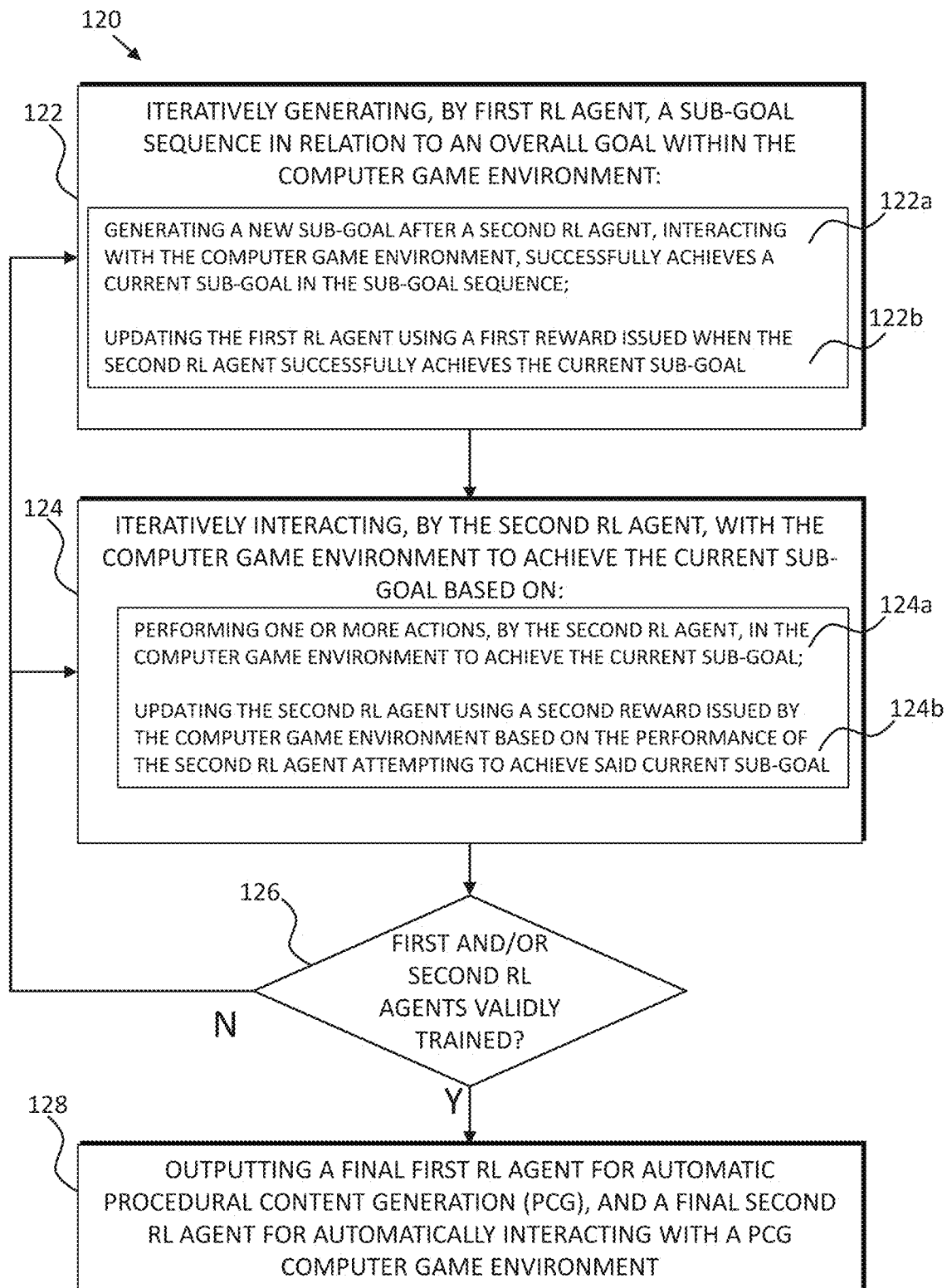
FIG. 1c illustrates an example RL training process for training the first and second RL agents in the adversarial RL training systems or of FIGS. 1a or 1b according to some embodiments of the invention.

FIG. 1c illustrates an example RL training process 120 for training the first and second RL agents in the adversarial RL training systems 100 or 110 of FIG. 1a or 1b. The Generator and Solvers 102 and 104 are trained with a version of self-play in which the Generator 102 and Solver 104 are trained in an iterative fashion one after the other and/or concurrently, with the training of the Solver 104 occurring at a higher frequency compared to that of the Generator 102. It is noted, that the training of the Generator 102 and Solver 104 is not a zero-sum game, where the gain of one is the loss of the other proportionally. Rather, the training of the Generator 102 and Solver 104 is a semi-collaborative game where there are elements of competition but also collaboration. This reduces the risk for exploits being developed by either the Generator or Solver 102 or 104 whilst more substantial/relevant challenges may be posed. The RL training process 120 may include the following steps of:

In step 122, iteratively generating, by the Generator 102, game environment data representative of a sub-goal sequence in relation to an overall goal within the computer game environment 106, which may include the following steps of: In 122a generating game environment data 103 representative of a new sub-goal for the sub-goal sequence after the Solver 104, interacting with the computer game environment 106, successfully achieves a current sub-goal in the sub-goal sequence. The computer game environment 106 may be updated based on the generated game environment data 103. In step 122b, updating the Generator 102 using a first reward 102b issued when the Solver 104 successfully achieves the current sub-goal. The first reward 102b may be issued by the computer game environment 106.

In step 124, iteratively interacting, by the Solver 104, with the computer game environment 106 to achieve a current sub-goal based on the following steps of: In step 124a, performing one or more actions, by the Solver 104, in the computer game environment 106 to achieve the current sub-goal. In step 124b, updating the Solver 104 using a second reward 104b issued by the computer game environment 106 based on the performance of the second RL agent attempting to achieve said current sub-goal.

In step 126, determining whether the Generator 102 and/or the Solver 104 have been validly trained. This may include the Solver 104 achieving a particular predetermined average success rate in relation to the generated game environment data 103 representative of each new sub-goal and/or sub-goal sequences and/or overall goals set by the Generator 102. This may include the Solver 104 and Generator 102 having been trained for a predetermined number of episodes/overall goals and the like. If the Generator 102 and the Solver 104 have been validly trained (e.g. "Y"), then the process 120 proceeds to step 128. Otherwise, if either the Generator 102 or the Solver 104 are not validly trained (e.g. "N"), or a maximum number of iterations have not been achieved thereto, then the process 120 proceeds to steps 122 or 124 for further training in relation to further game environment data representative of one or more new sub-goals, or new overall goals, episodes and the like in relation to the computer game environment 106.

In step 128, outputting, once validly trained, a final Generator 102 or Generator model for use in automatic procedural content generation (PCG) in the computer game environment, and outputting a final Solver 104 or Solver model for automatically interacting with a PCG computer game environment.

As an option, the frequency of performing step 124 for iteratively training the Solver 104 and updating the Solver 104 based on the Solver 104 iteratively interacting with the computer game environment 106 in relation to the current sub-goal is greater than the frequency of performing step 122 for iteratively training the Generator 102 and updating the Generator 102 based on the Generator 102 iteratively generating game environment data 103 representative of each sub-goal in the sequence of sub-goals towards the overall goal in the computer game environment 106.

The Generator 102 may be configured to iteratively generate the game environment data representative of each sub-goal of the sub-goal sequence in an iterative manner rather than generating all of the game environment data of the entire sub-goal sequence at once. That is, the Generator 102 performs an iterative creation process of the game environment data 103 one new sub-goal and/or one new overall goal at a time (e.g. one new sub-goal per iteration) rather than generating the whole computer game environment with overall goal at once. Thus, the adversarial RL Generator (e.g. ARLPCG) generates the whole computer game environment from scratch in an iterative fashion. One advantage with this approach is that the Generator 102 does not create new game environment data 103 representative of a new sub-goal (e.g. a new section/segment of the computer game environment 106) until after the Solver 104 achieves the current sub-goal (e.g. reaches the latest section/segment of the computer game environment 106), so the Generator 102 always creates a solvable new sub-goal (e.g. solvable reachable segment) for the playing character 105.

Figure 2A:
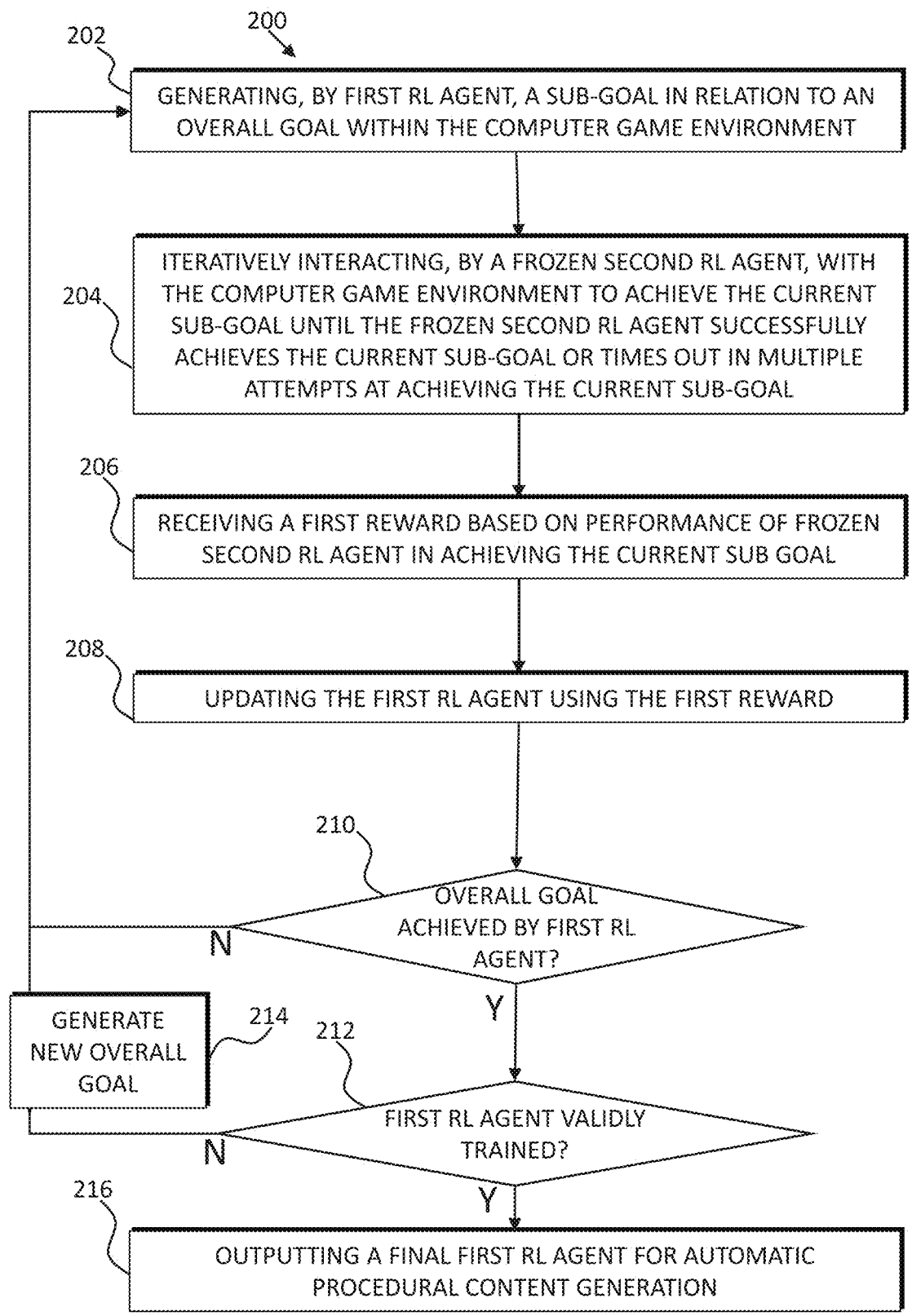
FIG. 2a illustrates an example iterative Generator RL training process for use in steps 122 and 124 of the RL training process of FIG. 1c and by adversarial RL training systems 100 or 110 according to some embodiments of the invention.
Figure 2B:
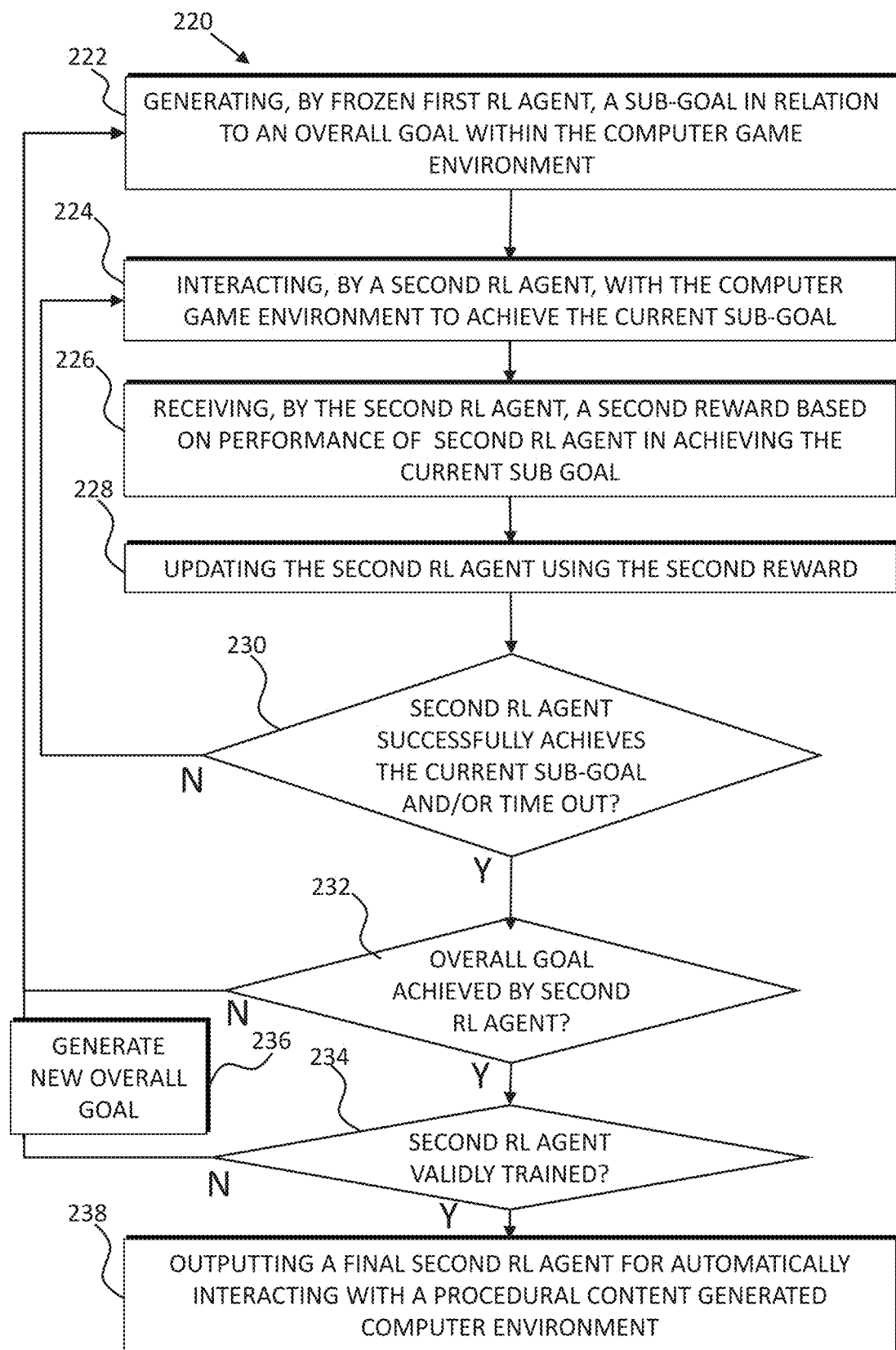
FIG. 2b illustrates an example iterative Solver RL training process for use in steps 122 and 124 of the RL training process of FIG. 1c and by adversarial RL training systems 100 or 110 according to some embodiments of the invention.

FIGS. 2a and 2b illustrates an example iterative Generator RL training process 200 and iterative Solver RL training process 220 for use in steps 122 and 124 of the RL training process 110 of FIG. 1c and by adversarial RL training systems 100 or 110. As previously described with reference to FIG. 1c, the Generator 102 and Solver 102 may be trained with a version of self-play, where the Generator 102 and Solver 104 are trained in an iterative fashion. In the example of FIG. 2a, the Generator 102 is trained in an iterative fashion with the state of the Solver network being frozen (i.e. only running inference) when the training Generator network is iteratively generating game environment data and/or updating. In the example of FIG. 2b, the Solver 104 is trained in an iterative fashion with the state of the Generator network being frozen (i.e. only running inference) when the training Solver network is iteratively interacting and/or updating.

Referring to FIG. 2a, the iterative Generator RL training process 200 may include the following steps of, where the state of the Solver network is frozen: In step 202, generating, by the Generator 102, game environment data 103 representative of a sub-goal in relation to an overall goal within the computer game environment 106. The computer game environment 106 is updated based on the generated game environment data 103, the generated sub-goal becomes the current sub-goal. In step 204, running inference by the frozen Solver 104, in which the Solver iteratively interacts with the computer game environment 106 to achieve the current sub-goal until the frozen Solver 104 successfully achieves the current sub-goal and/or times out in multiple attempts at achieving the current sub-goal. In step 206, receiving a first reward 102b based on the performance of the frozen Solver 104 in achieving the current sub-goal. In step 208, updating the network of the Generator 102 based on using the first reward 102b. In step 210, determining whether the overall goal has been achieved by the Generator 102 and/or the Solver 104. If the overall goal has been achieved by the Generator 102 (e.g. "Y"), then proceeding to step 212, otherwise the process 200 proceeds to step 202 for generating a next/new sub-goal towards achieving the overall goal. In step 212, determining whether the Generator network is validly trained, and proceeding to step 216 if the Generator network is validly trained (e.g. success rate has been achieved, max number of training iterations has been achieved), otherwise proceeding to step 214 if the Generator network is not validly trained. In step 214, generating a new overall goal/episode, as the current overall goal has been generated by the Generator 102, proceeding to step 202 for generating a new sub-goal towards the new overall goal. In step 216, outputting a final RL agent representative of the trained Generator 102 or Generator model, where the trained Generator 102 may be used for automatic PCG for computer game environments.

Referring to FIG. 2b, the iterative Solver RL training process 220 may include the following steps of, where the state of the Generator network is frozen: In step 222, running inference by the frozen Generator 102 by generating game environment data 103 representative of a sub-goal in relation to an overall goal within the computer game environment 106. The computer game environment 106 is updated based on the generated game environment data 103, the generated sub-goal becomes the current sub-goal. In step 224, interacting, by the Solver 104, with the computer game environment 106 to achieve the current sub-goal. In step 226, receiving a second reward 104b based on the performance of the Solver 104 in achieving the current sub-goal. In step 228, updating the network of the Solver 104 based on using the second reward 104b. In step 230, determining whether the Solver 104 successfully achieved the current sub-goal and/or timed out in multiple attempts/iterations at achieving the current sub-goal. If the current sub-goal is successfully achieved or the Solver has timed-out i.e. a maximum number of iterations for attempting to achieve the current sub-goal has been reached (e.g. "Y"), then proceeding to step 232, otherwise, if current sub-goal not achieved and Solver 104 not timed-out (e.g. "N"), proceeding to step 224 for interacting with the computer game environment 106 to achieve said current sub-goal. In step 232, determining whether the overall goal has been achieved by the Solver 104, if overall goal has been achieved by the Solver 104 (e.g. "Y") then proceed to step 234, otherwise (e.g. "N") proceed to step 222 for the frozen Generator 102 to generate a new sub-goal towards achieving the overall goal. In step 234, determining whether the Solver network is validly trained, and proceeding to step 238 if the Solver network is validly trained (e.g. success rate has been achieved, max number of training iterations has been achieved), otherwise proceeding to step 236 if the Solver network is not validly trained. In step 226, generating a new overall goal/episode by the frozen Generator 102, as the current overall goal has been generated by the Generator 102, proceeding to step 222 for generating a new sub-goal towards the new overall goal. In step 238, outputting a final RL agent representative of the trained Solver 104 or Solver model, where the trained Solver 104 may be used for automatically interacting with a PCG computer game environment and the like.

The iterative Generator RL training process 200 may be performed in step 122 of RL training process 120 of FIG. 1c, and the iterative Solver RL training process 220 may be performed in step 124 of RL training process 120 of FIG. 1c. Furthermore, within RL training process 120, the iterative Solver RL training process 220 of the Solver 104 may operate at a higher frequency that the iterative Generator RL training process 200, where the iterative Solver RL training process 220 performs hundreds of actions per episode with corresponding updates to the Solver network (e.g. generating actions 104a for controlling a player character 105), while the iterative Generator RL training process 200 completes actions 102a and updates to the Generator network (e.g. generating new game environment data 103) in the order of dozens. For example, the switch between iterative Generator RL training process 200 (e.g. step 122 of FIG. 1c) and the iterative Solver RL training process 220 may occur, without limitation, for example at a frequency of about a tenth for the iterative Generator RL training process 200 compared with the iterative Solver RL training process 220. Further fine-tuning of the trained Generator or trained Solver may be performed, if necessary, on either the Generator network or Solver network with the other RL agent network (e.g. Solver or Generator networks, respectively) being frozen and running inference only.

Further modifications to the adversarial RL training systems 100 and/or 110 and training RL process 120 of FIGS. 1a-1c and Generator/Solve RL processes 200 and 220 of FIGS. 2a and 2b may also include, rather than training one Solver 104 per Generator 102, training a population of Solvers 104 with said Generator 102. This may provide the advantage of further improving the diversity of the Generator's 102 output as it would be harder for the Generator 102 to exploit the behaviour of the population of Solvers 104, whilst improving the generalizability of the population of Solvers 104.

FIGS. 3 to 5 and FIGS. 6 to 8 illustrates examples of two types of 3D computer game environment that may be used with the adversarial RL training systems 100 or 110 for training a Generator 102 and Solver 104 based on using RL training processes 120, 200 and/or 220 as described with reference to FIGS. 1a to 2b. The types of example 3D computer game environments include, without limitation, for example a First Person Shooter (FPS) Platform game (also referred to as a FPS Platform game or Platform game) as described with reference to FIGS. 3 to 5 and a Racing (RC) game as described with reference to FIGS. 6 to 8. These are used for illustrating the operation and performance of the resulting trained Generator 102 and Solver 104 output from adversarial RL training system 110 with auxiliary diversity input signals 112a and 112b applied thereto. Although the example 3D computer game environments described herein are based on only two popular game genres, this is by way of example only and this disclosure is not so limited, it is to be appreciated by the skilled person that the adversarial RL training systems 100, 110 with or without auxiliary diversity input signals 112a and 112b for training a Generator 102 and a training a Solver 104 may be applied to any type of 2D and/or 3D computer game environment as the application demands.

In these examples, the Generator 102 parameterizes the corresponding game environment data 103 one goal at a time (e.g. segment by segment, platform by platform) in an iterative manner when outputting the generating game environment data 103 along with control parameters and the like. In both environments, an auxiliary diversity input value 112a/112b is applied to the Generator 102 and the computer game environment 106 during training, so when the auxiliary diversity input value is negative the Generator 102 receives a small negative reward per time step or iteration. The idea behind this setup is that the "ticking" negative values force the Generator 102 to create an environment that the Solver 104 either (depending on the auxiliary task) finishes and is successful, or fails fast. Thus, if the auxiliary diversity input value 112a/112b is low or negative, the Generator 102 will design/create game environment data 103 for updating the computer game environment 106 that is difficult while if the auxiliary diversity input value is high and/or positive the Generator 102 should design/create game environment data 103 that is easier for the Solver 104 and associated player character to traverse. Independent on the auxiliary diversity input value the Generator 102 also receives an incremental reward for the Solver's performance or progress towards one or more sub-goals and/or the overall goal (e.g. when the Solver 104 controls the player character closer to each predefined goal and/or the overall predefined goal). In the training, the overall goal positions within each game environment are randomized to further ensure that diversity in training, but also to train the Generator 102 to create a path or one or more game portions that achieve the predefined final goal/position set by a game designer. In these examples, the FPS and RC games are built in Unity (RTM) and connected to the adversarial RL training system 110 and computer game environment 106 using the so-called ML Agents API in Unity.

Figure 3:
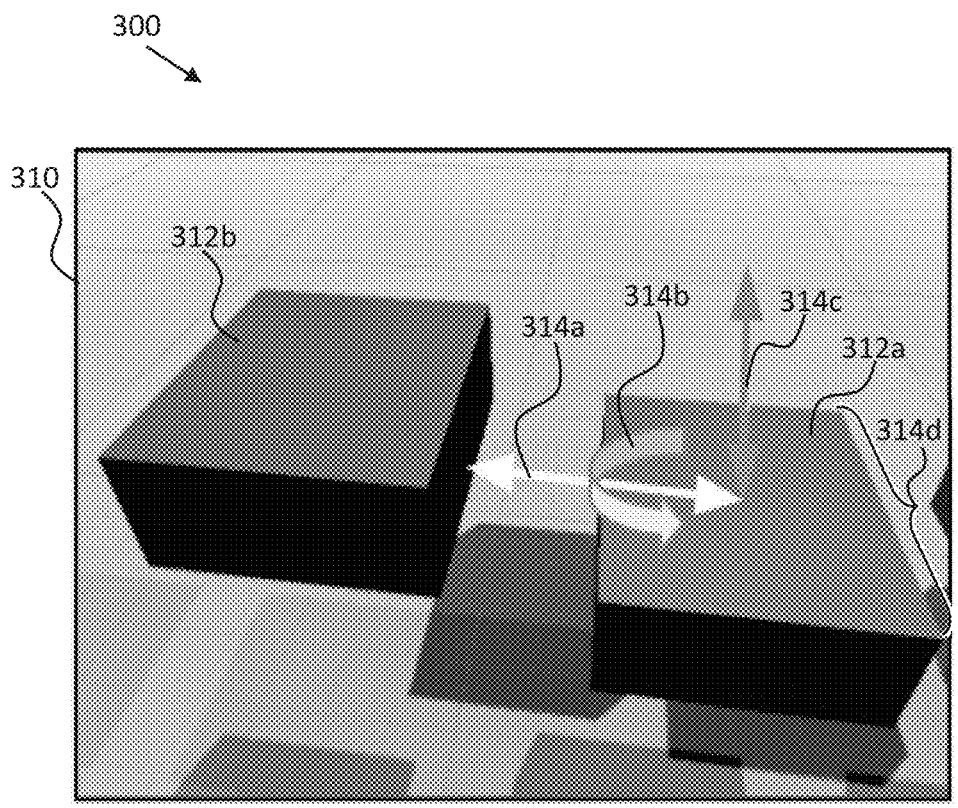
FIG. 3 illustrates an example First Person Shooter (FPS) platform game for training a Generator and Solver according to some embodiments of the invention.
Figure 3:
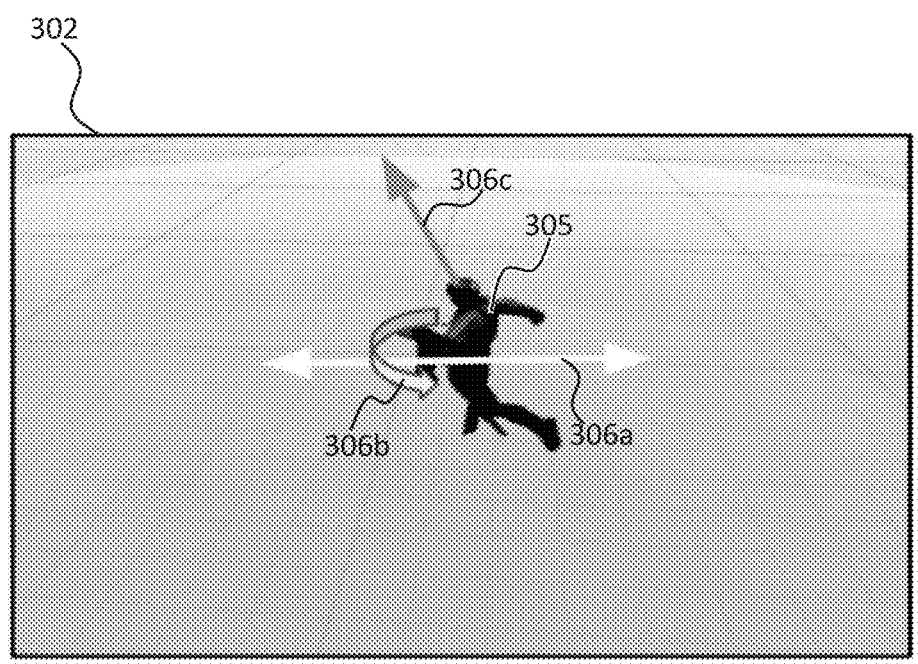

FIG. 3 illustrates an example FPS platform game 300 in which the Generator 102 (e.g. first RL agent) is trained to generate and output game environment data 310 for updating the computer game environment 106 of the Platform game 300, and the Solver 104 (e.g. second RL agent) is trained to interact with the computer game environment 106 of the Platform game 300 and output a set of actions for controlling a player character 305 in the Platform game 300. In the Platform game 300, the Solver 104 or a player controls a player character 305 with the overall goal of traversing as fast as possible to maximize reward along a generated track of a plurality of platform segment blocks 312a-312b placed within the computer game environment 106 of the Platform game 300.

In this example, the Generator 104 is configured to generate/create game environment data 310 including platform segment blocks 312a-312b and actions 314a-314d associated with each of the blocks 312a-312b that are representative of sub-goals that lead towards an overall goal (e.g. a final platform block) within the Platform game 300. Each of the sub-goals are represented by each of the platform segment blocks 312a-312b and actions controlling the characteristics of each platform segment block 312a-312b including, without limitation, for example distance 314a between platform segment blocks 312a-312b, angle of orientation 314b of platform segment 312a, and height 314c of each platform segment 312a relative to the next platform block 312b or a previous platform segment block, and also size 314d of each platform segment block 312a and any other suitable action for controlling the characteristics or features of the blocks 312a-312b as the application demands and the like. The Solver 104 is configured to interact with the computer game environment 106 of the Platform game 300 by controlling the player character 305 to achieve each of the sub-goals represented by each of the platform blocks 312a-312b and/or overall goal represented by the final sub-goal in the sub-goal sequence using a set of actions based on, without limitation, for example forward/backward actions 306a, turn actions 306b, and jumping actions 306c, and any other suitable action for controlling the player character 305 as the application demands and the like.

In this example, the Generator 102 includes a Generator network based on a feed forward neural network with at least 2 hidden layers and 512 neural units per layer, with a hyperparameter γ of 0.990. The RL technique used for training the Generator 102 is based on, without limitation, for example a Proximal Policy Optimization (PPO) algorithm and the like with a learning rate of 2e-4. The Generator 104 receives a first reward 102b from the computer game environment 106 of the Platform game 300 along with observation data in the form of a state vector. The observation data provided by the computer game environment 106 of the Platform game 300 to the Generator 102 consists of a game state array or vector including data representative of the relative position to the overall goal, angle relative to the overall goal, overall goal distance, previous block position, size, and rotation, and auxiliary diversity input value and the like.

In this example, the Solver 104 includes a Solver network based on a feed forward neural network with at least 2 hidden layers and 512 neural units, with hyperparameter γ of 0.990. The RL technique used for training the Solver 104 is based on, without limitation, for example a PPO algorithm and the like with a learning rate of 3e-4. The Solver 104 receives a second reward 104b from the computer game environment 106 of the Platform game 300 along with observation data based on a ray cast and state vector for navigating around obstacles within the computer game environment 106. For example, in the Platform game 300 the observation data may include a height map ray cast around the player character 305 of the Solver 104 for use by the Solver 104 to keep track of where the player character 305 is in relation to the platform segments representing sub-goals and/or overall goal and the like.

As an example, the Generator 102 is trained and configured to generate game environment data 310 that includes platform segment blocks with actions controlling the distance to next block (e.g. [5 m, 10 m]), the angle relative to the last two blocks (e.g. in degrees [−180, 180]), each block size (e.g. in metres [4 m, 6 m]), and height change (e.g. in metres [−2 m, 2 m]). The Solver 104 is trained and configured to control the actions of the player character 305 by inputting a set of actions 104a based on forward/backward, left/right turn, and jump actions to the computer game environment 106 of the Platform game 300.

The Generator 102 and Solver 104 are trained based on the RL training processes 120, 200 and/or 220 as described with reference to FIGS. 1a to 2b. For example, as previously described, the Generator 102 and Solver 104 may be trained with a version of self-play, where the Generator 102 and Solver 104 are trained in an iterative fashion. For example, in the Generator RL training process 200 of FIG. 2a, the Generator 102 is trained in an iterative fashion with the state of the Solver network being frozen (i.e. only running inference) with the Generator network iteratively generates game environment data, receiving the first reward 102b, and/or the network being updated accordingly. In the Solver RL training process 220 of FIG. 2b, the Solver 104 is trained in an iterative fashion with the state of the Generator network being frozen (i.e. only running inference) with the Solver network iteratively interacting with the computer game environment 106, receiving second reward 104b and/or the network being updated accordingly.

During training, the Solver 104 receives a positive or negative reward from the Solver reward function based on a second reward 104b from the computer game environment 106 of the Platform game 300. The Solver 104 may receive a positive reward based on the player character 305 moving towards the sub-goal, moving towards the overall goal, the time it takes to achieve a sub-goal/overall goal, and/or for completing the track or sequence of sub-goals. The Solver 104 receives a negative reward for failing to achieve each sub-goal and/or the overall goal, e.g. when the player character 305 falls off a platform segment or times out when attempting to complete the sub-goal associated with platform segment or overall goal associated with a plurality of platform segments. Generally, the reward function for the Solver 104 contains a progressive reward, plus a negative reward for failing. The negative reward for failing is important to have as it stops the Solver 104 from taking too "big a risk" when selecting the set of actions 104a for controlling the player character 305 and consequently forces the Generator 102 to create an computer game environment that is not impossible.

During training, the Generator 102 also receives a negative/positive reward from the Generator reward function, which may be based on the Solver 104 failing and is also dependent on the first reward 102b from the computer game environment 106 and the auxiliary diversity input value 112a. The Generator reward function with auxiliary scaling is based on $r = r_i \lambda_{A_i} \alpha + r_e \lambda_{A_i} \beta$ and is fed in as input to the Generator network in the form of an observation, $\lambda_{A_i}$ is the auxiliary diversity input signal 112a, $r_i/r_e$ are the internal/external generator rewards in which the external generator reward is the first reward 102b received from the computer game environment 106, with α; β being weighting factors that are adjusted by the designer of the game. The computer game environment 106 also receives the auxiliary diversity input signal 112b, which is the same as auxiliary diversity input signal 112a, and where the first reward 102b is based on the auxiliary diversity input value 112b and is connected to Solver's 104 failure primarily. For example, when the auxiliary diversity input signal is set to $\lambda_{A_i} = -1$ the failing of the Solver 104 is positively rewarding the Generator 102, where the computer game environment 106 reward function may generate a first reward 102b value in the region of, without limitation, for example 10. In another example, when the auxiliary diversity input signal is set to $\lambda_{A_i} = 1$ the failing of the Solver 104 is negatively rewarding the Generator 102, where the computer game environment 106 reward function may generate a first reward 102b value in the region of, without limitation, for example −10.

Figure 4:
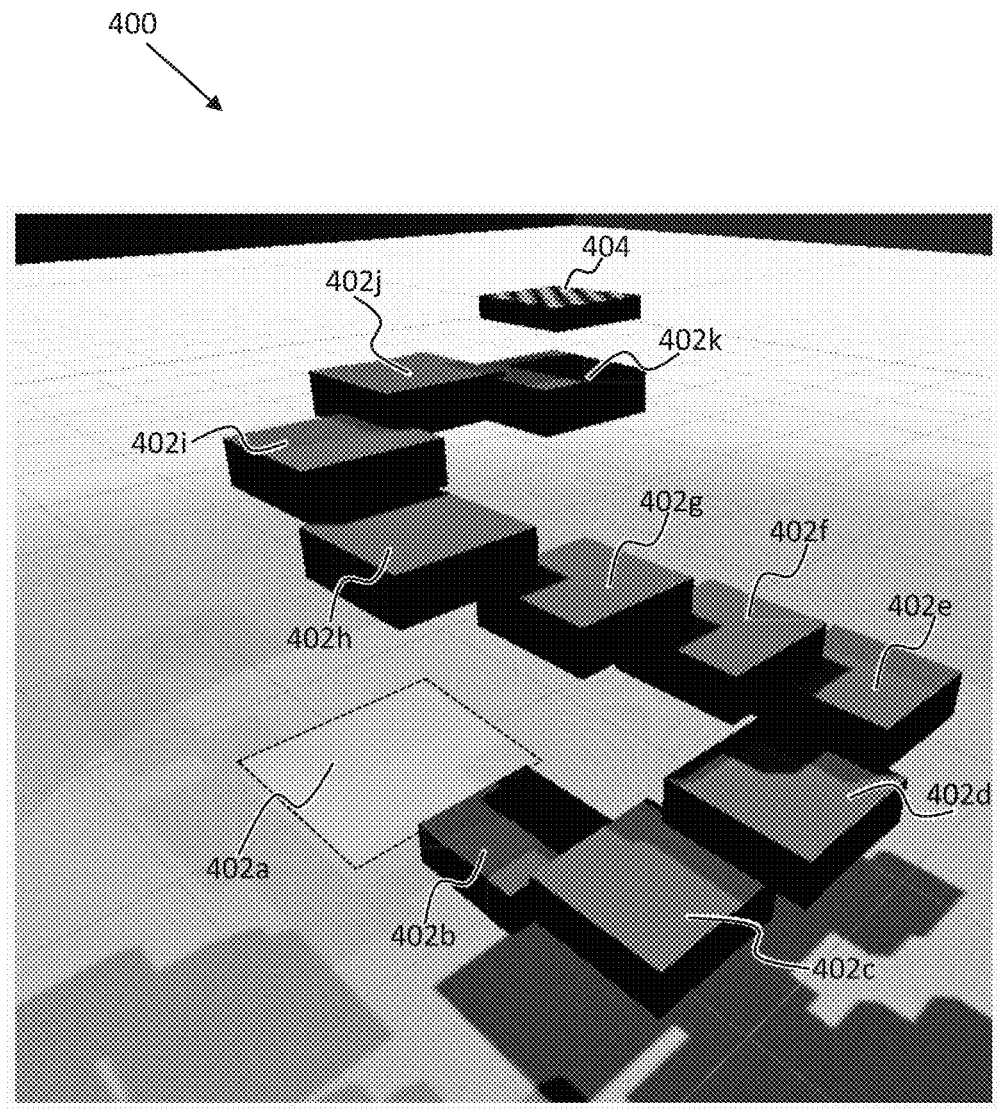
FIG. 4 illustrates an example FPS platform computer game environment output from a trained Generator according to some embodiments of the invention.

FIG. 4 illustrates an example Platform game environment 400 in which a path is represented by game environment data 402a-404k, 404 was generated by the trained Generator 102. In this example, the Generator 102 was trained as described with reference to FIG. 3 and configured to learn how to create a path to an overall goal represented by platform segment block 404 from an initial start platform segment block 402a. In this case, the Generator 102 learned to iteratively create a path of sub-goals represented by platform segment blocks 402a-402k towards a randomly generated overall goal represented by checkered platform segment block 404, whilst at the same time it allowed the Solver 104 to traverse each platform segment block and achieve the corresponding sub-goal represented by it. The overall goal was far above the initial start platform segment block 402a, e.g. a simulated 20 metres in the computer game environment 400, which resulted in the Generator 102 iteratively creating a sequence of sub-goals, each sub-goal represented by the plurality of platform segment blocks 402a-402k, and 404, which forms a "spiral staircase" from the start platform block position 402a to the overall goal represented by the checkered platform segment block 404. The Solver 104 is configured to interact with the Platform game environment 400 and the game environment data 402a-404 therein to control a player character 305 of FIG. 3 to traverse the "spiral staircase".

Figure 5:
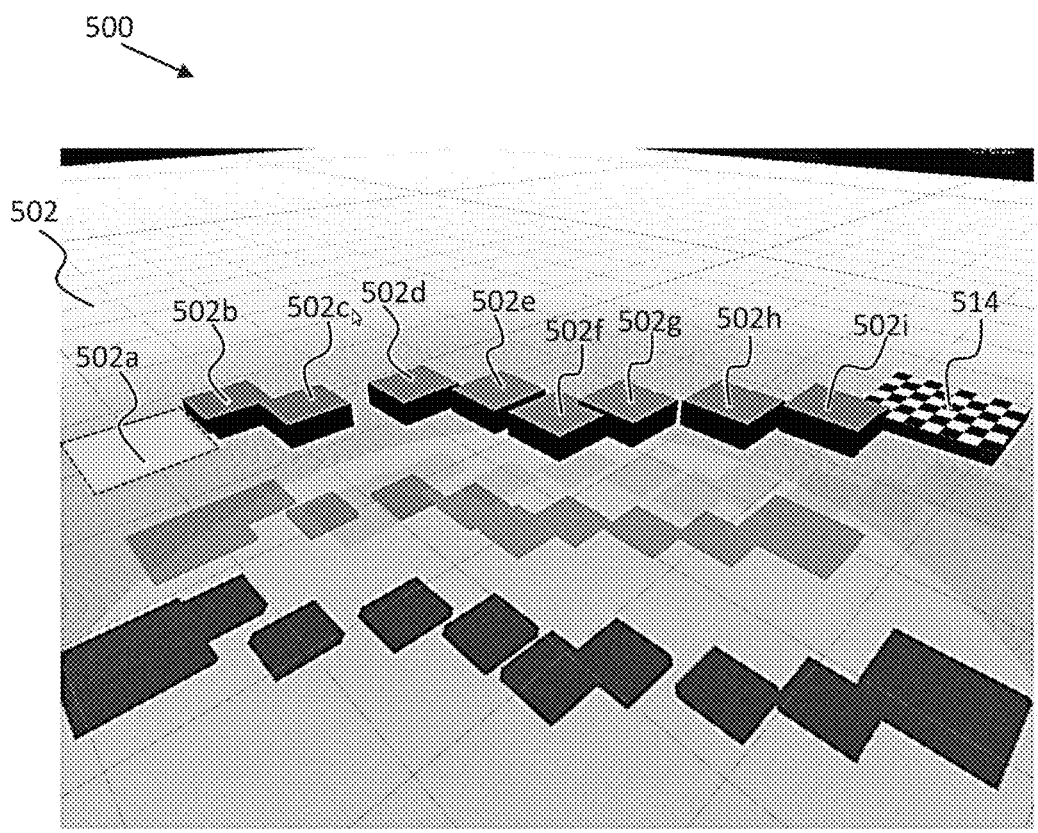
FIG. 5 illustrates an example outputs of a trained Generator for the FPS platform computer game of FIGS. 4 and 5 when varying the auxiliary diversity input value/signal input to the trained Generator according to some embodiments of the invention.
Figure 5:
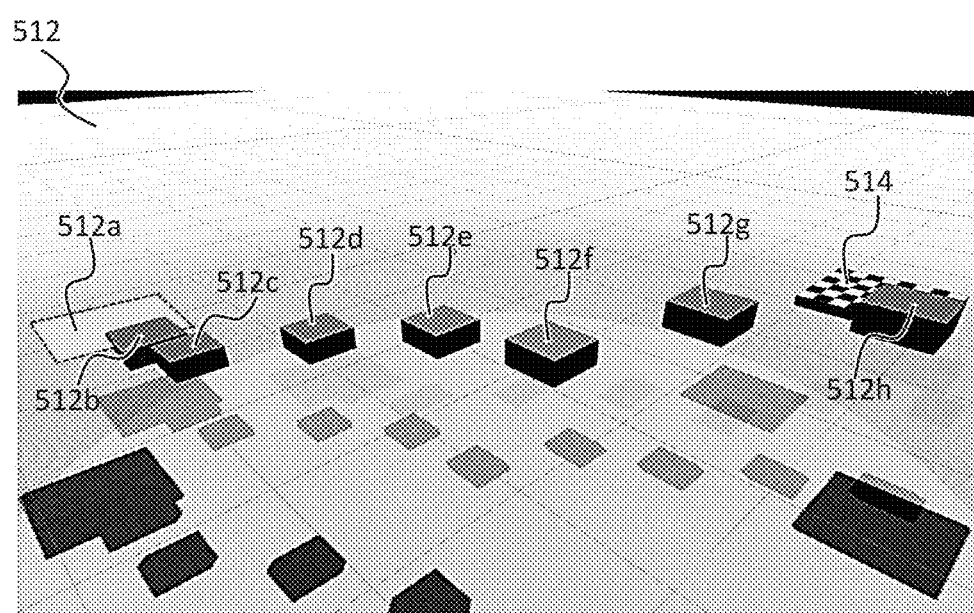

FIG. 5 illustrates further example Platform computer game environments 502 and 512 when the auxiliary diversity input values 112a/112b input to a trained Generator 102 are allowed to change. In environment 502, the trained Generator 102 creates game environment data 502a-502i, 504 representing a path of platform segment blocks 502a-

502*i*, 504 from a starting point platform segment block 502*a* to an overall goal checkered platform segment block 504. The auxiliary diversity input value was set at $\lambda_{A_i}=1$, which means that the Generator 102 generates an "easily" traversable path for the player character 305 of the Solver 104. This is illustrated by the closeness of the distances between platform segment blocks representing each sub-goal along the path from the starting point platform segment block 502*a* to the overall goal platform segment block 504. In environment 512, the trained Generator 102 creates game environment data 512*a*-512*g*, 514 representing a path of platform segment blocks 512*a*-512*g*, 514 from a starting point platform segment block 512*a* to an overall goal checkered platform segment block 514. The auxiliary diversity input value was set at $\lambda_{A_i}=-1$, which means that the Generator 102 generates an "difficult" traversable path for the player character 305 of the Solver 104. This is illustrated by the increased distances between platform segment blocks representing each sub-goal along the path from the starting point platform segment block 512*a* to the overall goal platform segment block 514.

In essence, FIG. 5 illustrates that with a high auxiliary diversity input value, e.g. $\lambda_{A_i}=1$, the Generator 104 creates a path/track that is easy for the Solver 104 to solve and traverse by controlling the player character 305 to get from the starting point platform segment block 502*a* to the overall goal platform segment block 504. On the other hand, with a low auxiliary value, e.g. $\lambda_{A_i}=-1$, the Generator 102 is configured to try to make the Solver 104 fail by making a path/track with sub-goals that are difficult for the player character 305 controlled by the Solver to achieve making it more likely the player character 305 falls off of a platform segment block as it traverses the path to the overall goal platform segment block 514.

Figure 6:
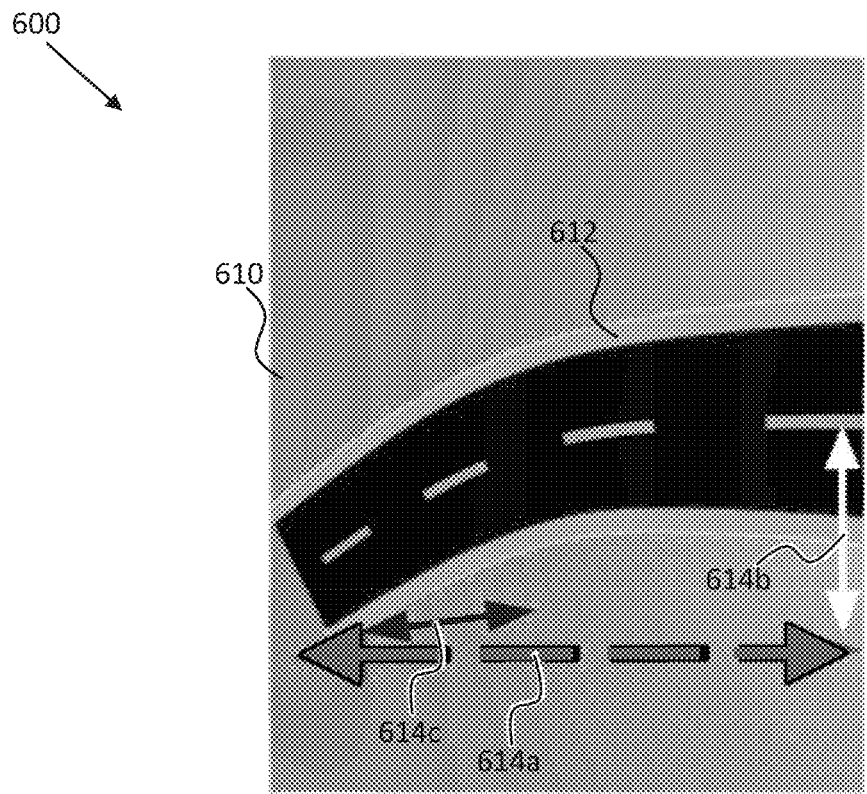
FIG. 6 illustrates an example Racing game for training a Generator and Solver according to some embodiments of the invention.
Figure 6:
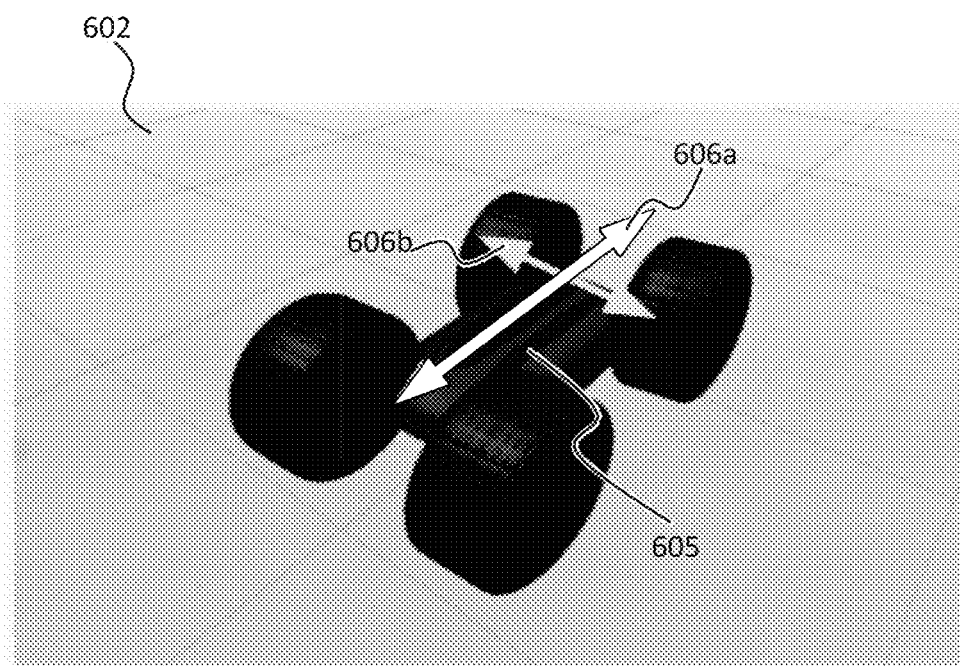
Figure 7:
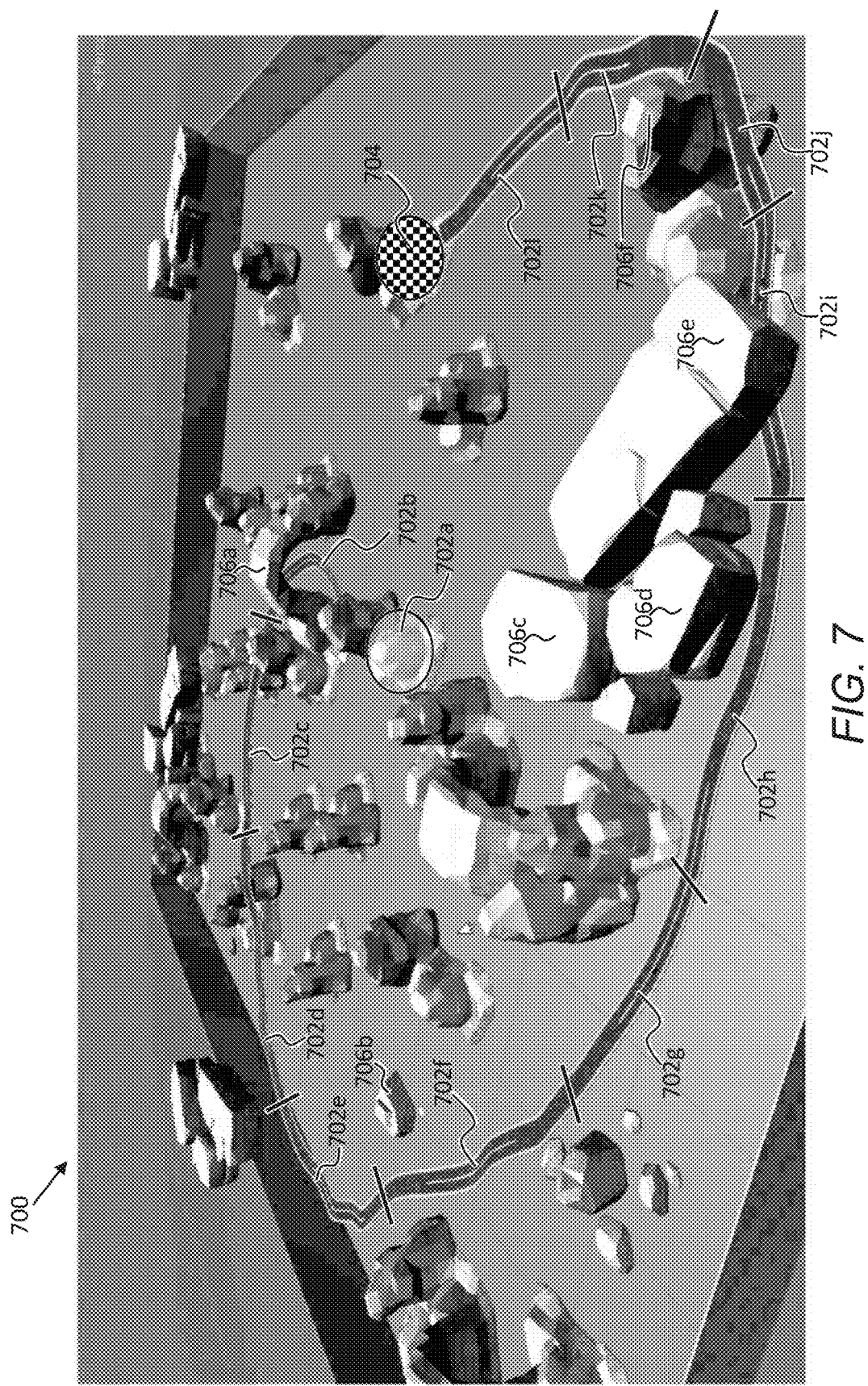
FIG. 7 illustrates an example Racing computer game environment output from a trained Generator according to some embodiments of the invention.
Figure 8:
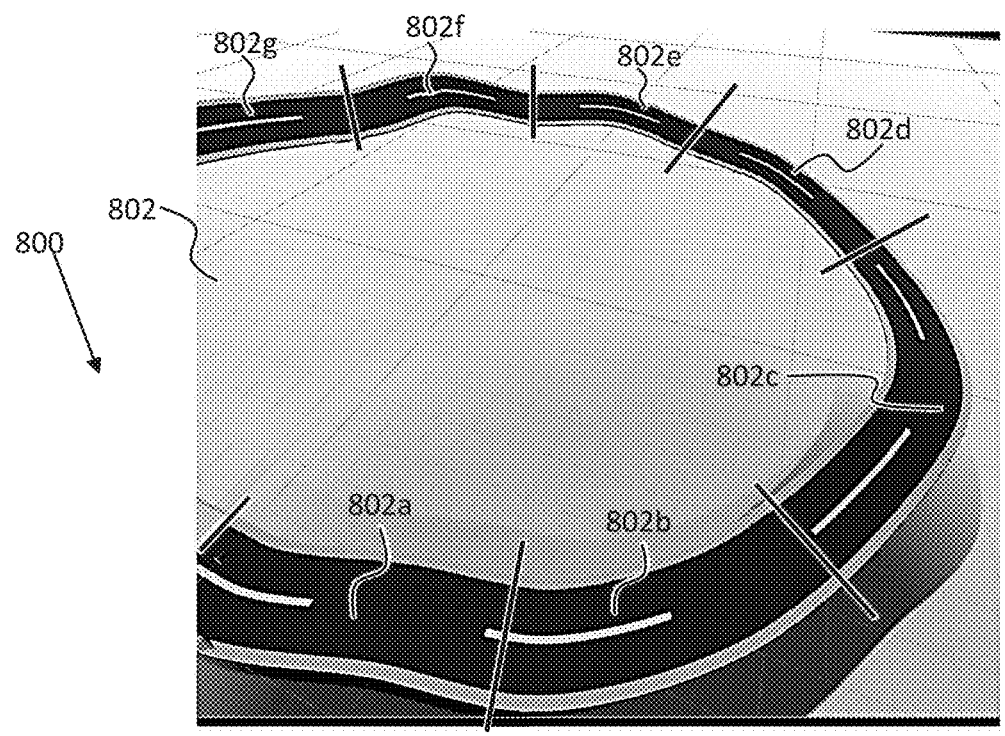
FIG. 8 illustrates an example outputs of a trained Generator for the Racing computer game of FIGS. 6 and 7 when varying the auxiliary diversity input value/signal input to the trained Generator according to some embodiments of the invention.
Figure 8:
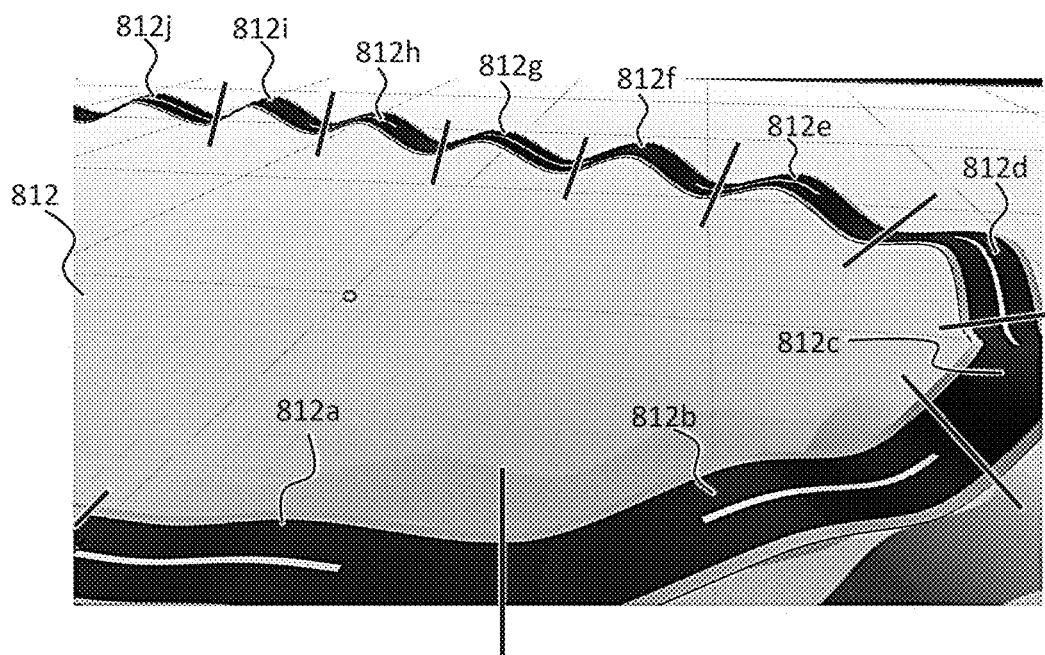

FIGS. 6 to 8 illustrate an example Racing game 600 in which the Generator 102 (e.g. first RL agent) is trained to generate and output game environment data 610 for updating the computer game environment 106 of the Racing game 600, and the Solver 104 (e.g. second RL agent) is trained to interact with the computer game environment 106 of the Racing game 600 and output a set of actions for controlling a player character 605 (e.g. a racing car) in the Racing game 600. In the Racing game 600, the Solver 104 or a player controls the player character 605 with the overall goal of traversing as fast as possible to maximize reward along a generated racing track of a plurality of racing track segments 612 iteratively placed by the Generator 102 within the computer game environment 106 of the Racing game 600. The road or racing track is iteratively created by the Generator 102, where in each iteration, the Generator 102 creates a new racing track segment for attaching to the unattached end of the racing track segment created in the previous iteration. This iterative process continues until the Generator 102 eventually creates a plurality of racing track segments 612 consecutively joined together that reach an overall goal. The Solver 104 may control the iterative process by requesting a new racing track segment from the Generator 102 prior to completing the current racing track segment 612. In this manner, the Generator 102 may generate a constant flow game environment data 610 representative of new racing track sections and sub-goals for the Solver 104 to achieve by controlling vehicle 605. The banking of each racing track segment is dependent on the curvature of the racing track. If the player character 305 (e.g. driver of vehicle) leaves the racing track (or road) it is terminated, otherwise it will continue over the racing track segments until an overall goal is reached (e.g. the road/racing track finishes/terminates) or the episode ends.

In this example, the Generator 104 is configured to generate/create game environment data 610 including racing track segments 612 and actions 614*a*-614*c* associated with each racing track segment 612 that are representative of sub-goals that lead towards an overall goal (e.g. the end of the racing track, a finish line is reached) within the Racing game 600. Each of the sub-goals are represented by each of the racing track segments 612 and actions controlling the characteristics of each racing track segment 612 including, without limitation, for example length 614*a* of a racing track segment 612, turn or curve/bank of the racing track segment 612*b*, and height 612*c* of the racing track segment 612 and/or any other suitable action for controlling the characteristics or features of each racing track segment 312 as the application demands and the like. The Solver 104 is configured to interact with the computer game environment 106 of the Racing game 600 by controlling the player character/vehicle 605 to achieve each of the sub-goals represented by the farthest end of each of the racing track segments 312 and/or overall goal represented by the final sub-goal in the sub-goal sequence using a set of actions based on, without limitation, for example throttle forward/backward actions 6*o*6*a* and turn actions 6*o*6*b*, and/or any other suitable action for controlling the player character/vehicle 605 as the application demands and the like.

In this example, the Generator 102 includes a Generator network based on a FFNN with at least 2 hidden layers and 512 hidden units per hidden layer, with a hyperparameter γ of 0.990. The RL technique used for training the Generator 102 is based on, without limitation, for example the PPO algorithm and the like with a learning rate of 2e-4. The Generator 104 also receives an auxiliary diversity input value signal 112*a* for use in the Generator reward function as herein described. The Generator 104 receives a first reward 102*b* from the computer game environment 106 of the Racing game 600 along with observation data in the form of the ray cast and the game state array. The observation data provided by the computer game environment 106 of the Racing game 600 to the Generator 102 consists of a ray cast in order to allow the Generator 102 to deploy racing track segments 612 within an already existing computer game environment with obstacles already in place, where the ray cast can be used by the Generator 102 as a collision detector to learn to avoid the obstacles while still creating a traversable racing track with the racing track segments 612. Further observation data includes the game state vector with data representative of the relative position of the end of current racing track to the overall goal, heading, angle relative to the overall goal, overall goal distance, previous racing track segment position, and auxiliary diversity input value and the like. Further rules may include terminating the episode should the racing track collide with an obstacle in the computer game environment 106 and/or with itself and the like.

In this example, the Solver 104 includes a Solver network based on a FFNN with at least 2 hidden layers and 512 hidden neural units for each hidden layer, with hyperparameter γ of 0.998. The RL technique used for training the Solver 104 is based on, without limitation, for example a PPO algorithm and the like with a learning rate of 3e-4. The Solver 104 receives a second reward 104*b* from the computer game environment 106 of the Racing game 600 along with observation data based on a ray cast and game state vector for providing information on the racing track/road ahead and around the vehicle 605 within the computer game environment 106. For example, in the Racing game 600 the observation data may include a ray cast around the player character/vehicle 605 of the Solver 104 for use by the Solver 104 to keep track of where the player character/vehicle 605 is in relation to the racing track segments 612 representing sub-goals and/or overall goal and the like. The game state vector may include, without limitation, for example data representative of relative position to the sub-goal/overall goal, heading relative to the sub-goal, angular velocity, velocity, and rotation, and/or any other useful data representative of the vehicle state in relation to the computer game environment 106.

As an example, the Generator 102 is trained and configured to generate game environment data 610 that includes racing track segments 612 with actions controlling the length of each racing track segment ([20 m, 30 m]), racing track segment curve (e.g. in degrees [−30, 30]), and racing track segment height change (e.g. in metres [−5 m, 5 m]). Each new racing track segment 612 may be requested by the Solver a predetermined distance or dynamically adjusted distance (e.g. in metres 15 m) before the racing track/road or segment ends, which allows the Generator 102 to generate a constant flow of new racing track segments when creating the racing track. The Solver 104 is trained and configured to control the actions of the player character/vehicle 605 by inputting a set of actions 104a based on throttle 614a and turn 614b actions to the computer game environment 106 of the Racing game 600.

The Generator 102 and Solver 104 are trained based on the RL training processes 120, 200 and/or 220 as described with reference to FIGS. 1a to 2b and in relation to the Platform game 300 with reference to FIGS. 3 to 5. During training, the Solver 104 receives a positive or negative reward from the Solver reward function based on the second reward 104b issued from the computer game environment 106 of the Racing game 600. The Solver 104 may receive a positive reward based on the player character/vehicle 605 moving towards the sub-goal represented by the end of the current racing track segment 312, moving towards the overall goal (e.g. finish line of the racing track), the time it takes to achieve a sub-goal/overall goal, and/or for completing a racing track segment, completing the track or a sequence of sub-goals/the overall goal. The Solver 104 receives a negative reward for failing to achieve each sub-goal and/or the overall goal, e.g. when the player character/vehicle 605 drives off a racing track segment or times out when attempting to complete the sub-goal associated with a racing track segment or overall goal associated with a plurality of racing track segments. Generally, the reward function for the Solver 104 contains a progressive reward, plus a negative reward for failing. The negative reward for failing is important to have as it stops the Solver 104 from taking too "big a risk" (e.g. driving too fast all the time) when selecting the set of actions 104a for controlling the player character/vehicle 605 and consequently forces the Generator 102 to create a computer game environment that is not impossible.

During training, the Generator 102 also receives a negative/positive reward from the Generator reward function, which may be based on the Solver 104 failing and is also dependent on the first reward 102b from the computer game environment 106 and the auxiliary diversity input value 112a. The Generator reward and computer game environment reward functions include an auxiliary diversity input signal or value 112a/112b and is based on those as described with reference to the Platform game 300 of FIGS. 3 to 5. For example, when the auxiliary diversity input signal is set to $\lambda_{A_i}=-1$ the failing of the Solver 104 is positively rewarding the Generator 102, where the computer game environment 106 reward function may generate a first reward 102b value in the region of, without limitation, for example 10. In another example, when the auxiliary diversity input signal is set to $\lambda_{A_i}=1$ the failing of the Solver 104 is negatively rewarding the Generator 102, where the computer game environment 106 reward function may generate a first reward 102b value in the region of, without limitation, for example −10. Additionally as an option, when $\lambda_{A_i}<0$ a further positive reward may be added for each time step that the player vehicle 605 is above a certain threshold above ground/segment of racing track. As a consequence a $\lambda_{A_i}=-1$ will maximize the air-time of the player vehicle 605 by the Generator 102 creating a heavily undulating racing track, while $\lambda_{A_i}=1$ will give reward for the Generator 102 when the Solver 104 moves towards the overall goal.

FIG. 7 illustrates an example Racing game environment 700 in which a racing track is represented by game environment data of racing track segments 702a-702l and 704 that were generated by the trained Generator 102. In this example, the Generator 102 was trained as described with reference to FIG. 6 and configured to learn how to create a racing track to an overall goal 704 represented by spherical rock formation 704 from an initial start position or racing track segment 702a. In this case, the Racing game computer game environment 700 included a plurality of obstacles, for example, obstacles 706a-706f that the Generator 102 learned, using ray casting and the game state vector, to iteratively create a racing track that avoids the obstacles 706a-706f and create a plurality of racing track segments 702a-702l representing sub-goals towards a randomly generated overall goal represented by the spherical rock formation 704. At the same time the Solver 104 traversed each racing track segment to achieve each corresponding sub-goal represented by it and hence the overall goal 704.

FIG. 8 illustrates further example Racing computer game environments 802 and 812 when the auxiliary diversity input values 112a/112b input to a trained Generator 102 are allowed to change. In environment 802, the trained Generator 102 creates game environment data 802a-802g representing a section of racing track that includes a plurality of racing track segments 802a-802g, each racing track segment representing a sub-goal. The auxiliary diversity input value was set at $\lambda_{A_i}=1$, which means that the Generator 102 generates an "easily" traversable or flat section of racing track for the player character/vehicle 605 of the Solver 104. This is illustrated by the relative flatness of the racing track segments 802a-802g. In environment 812, the trained Generator 102 creates game environment data 812a-812j representing a section of racing track that includes racing track segments 812a-812j. The auxiliary diversity input value was set at $\lambda_{A_j}=-1$, which means that the Generator 102 generates an "difficult" traversable portion of racing track for the player character/vehicle 605 of the Solver 104. This is illustrated by the increased undulations of the racing track segments 812a-812g. The low auxiliary value (<0) causes the Generator 102 to attempt to make the Solver 104 fail by making a track that increases the likelihood of "throwing" the player character/vehicle 605, controlled by the Solver 104, off the racing track.

As described with reference to FIGS. 3 to 5 and 6 to 8, in both Platform and Racing game environments 300, 400, 500, 600, 700, 800, the auxiliary diversity input value may be used to vary the difficulty of the corresponding computer game environment. In relation to both types of computer game environments, and also other further computer game environments, in order to generate a generalisable Generator 102 and Solver 104, the auxiliary diversity input values 112a/112b that are input to the Generator 102 and the computer game environment 106 may also be iteratively varied during training between [−1, 1] (or [−ATH, ATH], where ATH is the maximum positive auxiliary diversity input value 112a/112b) for different episodes/overall goals. For example, the auxiliary diversity input values 112a/112b, $\lambda_{A_i}$, may be randomly selected from the auxiliary diversity input values of [−1, −1, −0.5, 0.5, 1, 1], which, in the Platform and also Racing game examples was a distribution of auxiliary diversity input values that produced stable results in relation to the resulting trained Generator 102 and trained Solver 104. As an option, the auxiliary diversity input values 112a/112b, $\lambda_{A_i}$, may be randomly selected from a set of N>2 auxiliary diversity input values of [−ATH, −y_1, . . . −y_(N−2)/2, y_(N−2)/2, . . . , y_1, ATH], where ATH is a positive real number or integer representing the maximum auxiliary diversity input value, and y_1, . . . , y_(n−2)/2 are positive real numbers or integers in the range [0,ATTH]. Alternatively, the auxiliary diversity input values 112a/112b, $\lambda_{A_i}$, may also be randomly selected from the auxiliary diversity input values as continuous values in the range of [−1, 1] or [−ATH, ATH] and the like, and/or as the application demands.

FIGS. 9 to 11 illustrate the performance results for a trained Fixed agent, a Rule PCG agent and a trained Solver 104 (also referred to as a ARLPCG Solver agent) when operating in unseen computer game environments in relation to, without limitation, for example the Racing and Platform game environments 600 and 300 of FIGS. 6 to 8 and 3 to 5. To test the generalization ability of the Solver 104 trained using the adversarial RL training system 110 (also referred to as an ARLPCG Solver agent) when trained using a Generator 102 trained using the adversarial RL training system 110 (also referred to as a ARLPCG Generator), several experiments were performed based on training the same RL agent (i.e. same hyper-parameters, observations, actions, rewards, etc.) on differently generated environments. Three approaches were used: 1) Training a Solver agent on a fixed map (referred as Fixed Solver agent) 2) Training a Solver agent on a rule based PCG environment (referred as Rule PCG Solver agent), where, in the rule based PCG environment rules are set for the PCG generator to generate environments based on randomly generated numbers; and 3) ARLPCG system 110 in which a Solver 104 (e.g. ARLPCG Solver agent) is trained using a trained Generator 102 (e.g. ARLPCG Generator) as described with reference to FIGS. 1a to 8 with different auxiliary diversity input values input to the ARLPCG Generator in the range of [−1, 1].

FIGS. 9 and 10 illustrate tables 900 and 1000 that show examples of trained Generator 102 output for use by the different types of agents in relation to the Racing game environment as described with reference to FIGS. 6 to 8 and the Platform game environment as described with reference to FIGS. 3 to 5. These tables 900 and 1000 may be used to quantify if there is some relation between the auxiliary diversity input signal and the output of the trained Generator 102, in which three different agents were taken and validated with a set of trained Generator 102 generated tracks. For the Solver 104 (also referred in the table as ARLPCG Solver 104), which was trained by the adversarial RL training system 110, this can be seen as a function of the training where the Generator 102 learns to adapt to the Solver's 104 behaviour. Tables 900 and 1000 of FIGS. 9 and 10 illustrate how all the three types of trained Solvers can "struggle" more with computer game environments generated by low auxiliary diversity input values (<0 the harder ones) than the computer game environments generated with high auxiliary diversity input values (>0 the easier ones). As can be seen, the trained Generator 102 (or ARLPCG Generator) can be used to create different styles of tracks/goals and computer game environments to a certain degree of difficulty and/or diversity based on varying the auxiliary diversity input value (e.g. varying the auxiliary diversity input value between from 1 to −1, or AT to −ATH, depending on scaling and the like).

FIG. 9 illustrates a table 900 for comparing the performance of differently trained second RL agents (or Solver agents) on unseen generated computer game environments generated by a trained ARL PCG Generator agent (e.g. first RL agent/Generator 102 of FIG. 1b) in relation to the Racing game computer environments 600-800 as described with reference to FIGS. 6 to 8. The differently trained Solver agents are based on the fixed Solver agent, the Rule PCG Solver agent and the ARLPCG Solver agent (e.g. Solver 104). In this example, these three trained second RL agents, or Solvers, are compared within an unseen Racing computer game environment generated by a trained ARLPCG Generator agent 102 (e.g. a trained first RL agent/Generator 102 of FIG. 1b).

Initially, each of the trained Fixed, Rule PCG and ARLPCG second/Solver RL agents are trained using a Fixed, Rule PCG, and ARLPCG generated computer game environment, respectively. Then each trained Fixed, Rule PCG and ARLPCG Solver agent is assessed based on average success ratio and speed on in relation to achieving an overall goal on generated racing tracks within a computer game environment that are generated by a trained ARL PCG Generator agent based on trained first RL agent/Generator 102 described with reference to FIG. 1b and/or FIGS. 6 to 8. The auxiliary diversity input value of the trained ARL PCG Generator agent is varied within the range between [−1, 1] to moderate the difficulty of the output track/computer game environment. The auxiliary diversity input value affects the diversity and/or difficulty of the generated sub-goals and overall goal and resulting Racing computer game environment. The success ratio and average speed reflects the difficulty even for the Solver agents (e.g. Fixed and Rule PCG Solvers) that were not trained using the ARL PCG Generator 102.

In table 900, the results for each trained Solver (e.g. Fixed Solver, Rule PCG Solver and ARLPCG Solver) and Auxiliary value are averaged over 2000 trials on 20 tracks, where each track has a simulated scale of being 1 km long within the computer game environment. As illustrated, the trained ARLPCG Solver agent (e.g. Solver 104) outperforms both the Fixed Solver agent and Rule PCG Solver agents most of the time in terms of either average success rate or overall speed within each of the unseen generated Racing computer game environments. Even though the Fixed Solver agent sometimes has the highest overall speed, it has the lowest success rate which decreases as the difficulty of the unseen generated Racing computer game environment increases (e.g. difficulty increases as the auxiliary diversity input value changes from 1 to −1). The Fixed Solver agent is severely limited for use in unseen computer game environments. Even though the Rule PCG Solver agent has success in completing the overall goals on the unseen generated tracks in the Racing computer game environment, its performance in terms of success error rate and average speed deteriorates compared with the success standard deviation and average speed of the ARL PCG Solver agent 104 achieves as the difficulty or diversity of the unseen racing tracks in the Racing computer game environments increase.

FIG. 10 illustrates a table 1000 for comparing the performance of differently trained second RL agents (or Solver agents) on unseen generated computer game environments generated by a trained ARL PCG Generator agent 102 within in relation to the Platform computer game environment as described with reference to FIGS. 3 to 5. The differently trained Solver agents are based on fixed Solver agent, Rule PCG Solver agent and ARLPCG Solver agent 104. In this example, these three trained second RL agents, or Solvers, are compared within the Platform computer game environment generated by a trained ARLPCG Generator agent 102.

Initially, each of the trained Fixed, Rule PCG and ARLPCG second/Solver RL agents are trained using a Fixed, Rule PCG, and ARLPCG generated computer game environment, respectively. Then each trained Fixed, Rule PCG and ARLPCG Solver agent is assessed in relation to an overall goal within a computer game environment generated by a trained ARL PCG Generator agent 102. Again, the auxiliary diversity input value of the trained ARL PCG Generator agent 102 is varied within the range between [-1, 1] to moderate the difficulty of the generated platform track/computer game environment. The auxiliary diversity input value affects the diversity and/or difficulty of the generated goals and resulting Platform computer game environment.

In table 1000, the results for each trained Solver (e.g. Fixed Solver, Rule PCG Solver and ARLPCG Solver) and Auxiliary value are averaged over 50000 trials (50 tracks and 1000 trials). As illustrated, the trained ARLPCG Solver agent 104 outperforms both the Fixed Solver agent and Rule PCG Solver agents within each of the unseen generated Platform computer game environments. The Fixed Solver agent simply cannot complete the overall goals in each unseen generated Platform computer game environment, and so is severely limited for use in unseen computer game environments. Even though the Rule PCG Solver agent is able to complete some of the overall goals in each unseen generated Platform computer game environment, its performance deteriorates compared with the trained ARL PCG Solver agent 104 as the difficulty or diversity of the unseen Platform computer game environment increases.

FIG. 11 illustrates a table 1100 for comparing the performance of differently trained second RL agents (or Solver agents) on unseen generated computer game environments for validation. In this example, two computer game environments were tested based on the Platform game described with reference to FIGS. 3 to 5 and the Racing game as described with reference to FIGS. 6 to 8. Comparison of performance on a set of previously unseen validation tracks/platforms (1000×20 runs). In relation to the first column in table 1100, which represents the Platform game example, the Platform game row values refers to success rate, fraction of platform tracks completed by at least one Solver agent, and in brackets average steps taken to reach the overall goal. In relation to the second column in table 1100, which represents the Racing game example, the Racing game row values refers to success rate and in brackets the average speed. The Fixed track Solver agent is trained on a fixed set of tracks, the Rule PCG Solver agent is trained on rule based PCG generated from a set of rules randomized to create different track every time, Fixed aux. Solver agent is trained from a ARLPCG Generator agent (e.g. trained first RL agent/Generator of FIG. 1b) with a constant auxiliary diversity input value, and ARLPCG Solver agent 104 is trained with varying auxiliary diversity input values. As can be seen, the ARLPCG Solver agent 104 outperforms the Fixed track Solver agent, Rule PCG Solver agent and Fixed aux. Solver agent in terms of success rate, fraction of platform tracks completed, and average speed over the racing tracks. This shows that the ARLPCG Solver agent 104 is generalizable and adaptable to unseen computer game environments.

Further modifications to the adversarial RL training systems 100 and 110 and/or Generators 102 and Solvers 104 as described with reference to FIGS. 1a to 11 may include using a multi-dimensional auxiliary diversity input functions, which may potentially further increase the diversity of the generated computer game environments generated by a trained Generator 102 and/or the generalizability of the resulting trained Solver agents 104. Another advantage with the adversarial RL training systems 100 and 110 is that the resulting trained Generator 102 can generate different computer game environments (controlled via an auxiliary diversity input signal/value) for other use cases, such as real-time map creation. Further modifications may also include, rather than using one Solver 104 per Generator 102, using a population of Solvers 104 could further improve the diversity of the Generator's 102 output as it would be harder for the Generator 102 to exploit the behaviour of the population of Solvers 104.

Figure 12:
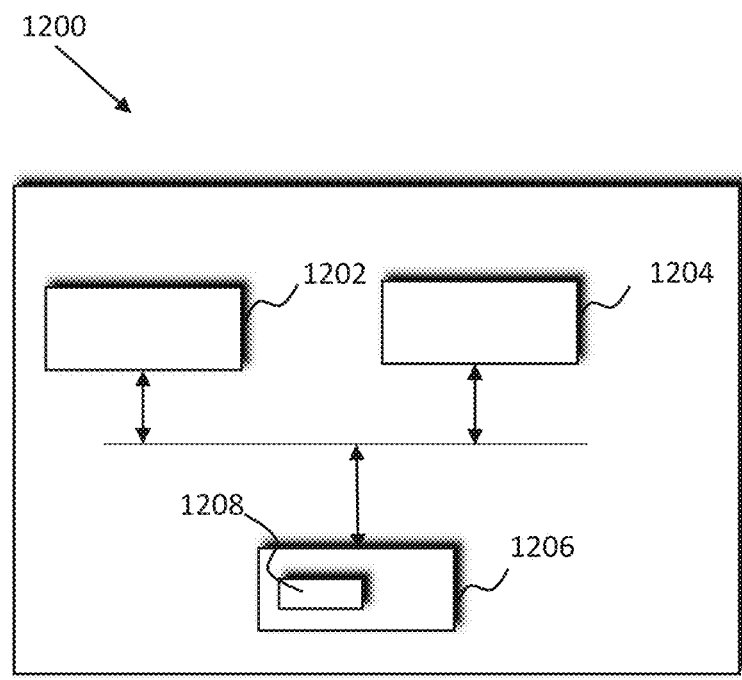
FIG. 12 is a schematic diagram of a computing system according to some embodiments of the invention.

FIG. 12 illustrates a schematic example of a system/apparatus 1200 for performing any of the methods described herein. The system/apparatus 1200 shown is an example of a computing device. It will be appreciated by the skilled person that other types of computing devices/systems may alternatively be used to implement the methods described herein, such as a distributed computing system or cloud computing system and the like.

The apparatus (or system) 1200 comprises one or more processors 1202. The one or more processors 1202 control operation of other components of the system/apparatus 1200. The one or more processors 1202 may, for example, comprise a general-purpose processor. The one or more processors 1202 may be a single core device or a multiple core device. The one or more processors 1202 may comprise a Central Processing Unit (CPU) or a graphical processing unit (GPU). Alternatively, the one or more processors 1202 may comprise specialized processing hardware, for instance a RISC processor or programmable hardware with embedded firmware. Multiple processors may be included.

The system/apparatus 1200 comprises a working or volatile memory 1204. The one or more processors may access the volatile memory 1204 in order to process data and may control the storage of data in memory. The volatile memory 1204 may comprise RAM of any type, for example, Static RAM (SRAM), Dynamic RAM (DRAM), or it may comprise Flash memory, such as an SD-Card.

The system/apparatus 1200 comprises a non-volatile memory 1206. The non-volatile memory 1206 stores a set of operation instructions 1208 for controlling the operation of the processors 1202 in the form of computer readable instructions. The non-volatile memory 1206 may be a memory of any kind such as a Read Only Memory (ROM), a Flash memory or a magnetic drive memory.

The one or more processors 1202 are configured to execute operating instructions 1208 to cause the system/apparatus to perform any of the methods described herein. The operating instructions 1208 may comprise code (i.e. drivers) relating to the hardware components of the system/apparatus 1200, as well as code relating to the basic operation of the system/apparatus 1200. Generally speaking, the one or more processors 1202 execute one or more instructions of the operating instructions 1208, which are stored permanently or semi-permanently in the non-volatile memory 1206, using the volatile memory 1204 to store temporarily data generated during execution of said operating instructions 1208.

For example, the system/apparatus 1200 may be configured for training a first RL agent and a second RL agent coupled to a computer game environment of a video game. The system/apparatus 1200 may include: a generation module for configuring a first RL agent to iteratively generate a sub-goal sequence in relation to an overall goal within the computer game environment, where the first RL agent module generates a new sub-goal for the sub-goal sequence after a second RL agent, interacting with the computer game environment, successfully achieves a current sub-goal in the sub-goal sequence. The system/apparatus 1200 may be configured to also include an interaction module for configuring a second RL agent to iteratively interact with the computer game environment to achieve the current sub-goal, where each iterative interaction includes an attempt by the second RL agent for interacting with the computer game environment to achieve the current sub-goal. The system/apparatus 1200 may also be configured to include a first update module for updating the first RL agent using a first reward issued when the second RL agent successfully achieves the current sub-goal. The system/apparatus 1200 may also be configured to include a second update module for updating the second RL agent using a second reward issued by the computer game environment based on the performance of the second RL agent attempting to achieve said current sub-goal. The system/apparatus 1200 may include an output module for outputting, once the first and second RL agents are determined to be validly trained, a final first RL agent for automatic PCG in the computer game environment, and a final second RL agent for automatically interacting with a PCG computer game environment.

Implementations of the methods described herein may be realized as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 12, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims and their equivalents.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The invention claimed is:

1. A computer-implemented method for training a first reinforcement-learning, RL, agent and a second RL agent using RL techniques, wherein the first RL agent is trained to perform procedural content generation in a computer game environment of a video game and the second RL agent is trained to interact with computer game environments of the video game, the method comprising:
   generating, by the first RL agent, game environment data representing a computer game environment, and setting, by the first RL agent, an overall goal to be achieved within the computer game environment;
   performing one or more actions, by the second RL agent, in the computer game environment to achieve the overall goal;
   updating the second RL agent using a reward issued by the computer game environment based on the performance of the second RL agent attempting to achieve said overall goal;
   updating the first RL agent using a further reward issued based on the performance of second RL agent achieving the overall goal; and
   outputting, once validly trained, either a final first RL agent for automatic procedural content generation, PCG, in the computer game environment, or a final second RL agent for automatically interacting with a PCG computer game environment.

2. The computer-implemented method of claim 1, wherein setting, by the first RL agent, an overall goal to be achieved within the computer game environment comprises iteratively generating, by the first RL agent, a sub-goal sequence in relation to the overall goal.

3. The computer-implemented method of claim 2, wherein iteratively generating, by the first RL agent, a sub-goal sequence in relation to the overall goal comprises:
   generating a new sub-goal for the sub-goal sequence after the second RL agent, interacting with the computer game environment, successfully achieves a current sub-goal in the sub-goal sequence; and
   updating the first RL agent using a first reward issued when the second RL agent successfully achieves the current sub-goal.

4. The computer-implemented method of claim 3, wherein performing one or more actions, by the second RL agent, in the computer game environment to achieve the overall goal comprises iteratively interacting, by the second RL agent, with the computer game environment to achieve the current sub-goal based on:

performing one or more actions, by the second RL agent, in the computer game environment to achieve the current sub-goal; and updating the second RL agent using a second reward issued by the computer game environment based on the performance of the second RL agent attempting to achieve said current sub-goal.

5. The computer-implemented method of claim 3, further comprising applying an auxiliary diversity signal to a reward function of the first RL agent, the reward function of the first RL agent comprising a combination of an external reward and an internal reward, the external reward based on the first reward and the internal reward based on the auxiliary diversity signal and the performance of the first RL agent in generating said sub-goals for achieving the overall goal in the computer game environment.

6. The computer-implemented method of claim 5, further comprising applying the auxiliary diversity signal to the computer game environment for use in generating the first reward.

7. The computer-implemented method of claim 3, wherein a sub-goal in the computer game environment comprises at least one of:

one or more objects within the computer game environment to be interacted with by the second RL agent in the computer game environment;

a segment of a track or path within the computer game environment to be traversed by the second RL agent in the computer game environment; and a section of the computer game environment to be solved or traversed by the second RL agent in the computer game environment.

8. The computer-implemented method of claim 3, wherein the input to the first RL agent is game environment data and the first reward and the output from the first RL agent is game environment data associated with the new sub-goal for updating the computer game environment and causing the second RL agent associated with a player character in the computer game environment to perform one or more further actions to achieve the new sub-goal.

9. The computer-implemented method of claim 1, wherein the computer game environment is a three-dimensional game environment.

10. The computer-implemented method of claim 1, wherein the first and second RL agents each comprise a neural network with at least two interconnected layers, each layer comprising a plurality of neural units connected together.

11. The computer-implemented method of claim 10, wherein the neural network is a feed forward neural network.

12. The computer-implemented method of claim 1, wherein the RL techniques used for training and updating the first and second RL agents is based on one or more proximal policy optimisation algorithms.

13. A system for training a first reinforcement learning, RL, agent and a second RL agent coupled to a computer game environment of a video game, the system comprising:

a generation module for configuring a first RL agent to generate game environment data representing a computer game environment and set an overall goal to be achieved within the computer game environment;

an interaction module for configuring the second RL agent to interact with the computer game environment to achieve the overall goal;

an update module for updating the second RL agent using a reward issued by the computer game environment based on the performance of the second RL agent attempting to achieve the overall goal;

a further update module for updating the first RL agent using a further reward issued based on the performance of the second RL agent achieving the overall goal;

an output module for outputting, once the first and second RL agents are validly trained, either a final first RL agent for automatic procedural content generation, PCG, in the computer game environment, or a final second RL agent for automatically interacting with a PCG computer game environment.

14. The system of claim 13, wherein setting, by the first RL agent, an overall goal to be achieved within the computer game environment comprises iteratively generating, by the first RL agent, a sub-goal sequence in relation to the overall goal.

15. The system of claim 14, wherein iteratively generating, by the first RL agent, a sub-goal sequence in relation to the overall goal comprises:

generating a new sub-goal for the sub-goal sequence after the second RL agent, interacting with the computer game environment, successfully achieves a current sub-goal in the sub-goal sequence; and updating the first RL agent using a first reward issued when the second RL agent successfully achieves the current sub-goal.

16. The system of claim 15, wherein performing one or more actions, by the second RL agent, in the computer game environment to achieve the overall goal comprises iteratively interacting, by the second RL agent, with the computer game environment to achieve the current sub-goal based on:

performing one or more actions, by the second RL agent, in the computer game environment to achieve the current sub-goal; and updating the second RL agent using a second reward issued by the computer game environment based on the performance of the second RL agent attempting to achieve said current sub-goal.

17. A non-transitory tangible computer-readable medium comprising data or instruction code for training a first RL agent and a second RL agent coupled to a computer game environment of a video game, which when executed on one or more processor(s), causes at least one of the one or more processor(s) to perform the method of:

generating, by the first RL agent, game environment data representing a computer game environment, and setting, by the first RL agent, an overall goal to be achieved within the computer game environment;

performing one or more actions, by the second RL agent, in the computer game environment to achieve the overall goal;

updating the second RL agent using a reward issued by the computer game environment based on the performance of the second RL agent attempting to achieve said overall goal;

updating the first RL agent using a further reward issued based on the performance of second RL agent achieving the overall goal; and outputting, once validly trained, either a final first RL agent for automatic procedural content generation, PCG, in the computer game environment, or a final second RL agent for automatically interacting with a PCG computer game environment.

18. The non-transitory tangible computer-readable medium of claim 17, wherein setting, by the first RL agent, an overall goal to be achieved within the computer game environment comprises iteratively generating, by the first RL agent, a sub-goal sequence in relation to the overall goal.

19. The non-transitory tangible computer-readable medium of claim 18, wherein iteratively generating, by the first RL agent, a sub-goal sequence in relation to the overall goal comprises:
  generating a new sub-goal for the sub-goal sequence after the second RL agent, interacting with the computer game environment, successfully achieves a current sub-goal in the sub-goal sequence; and
  updating the first RL agent using a first reward issued when the second RL agent successfully achieves the current sub-goal.

20. The non-transitory tangible computer-readable medium of claim 19, wherein performing one or more actions, by the second RL agent, in the computer game environment to achieve the overall goal comprises iteratively interacting, by the second RL agent, with the computer game environment to achieve the current sub-goal based on:
  performing one or more actions, by the second RL agent, in the computer game environment to achieve the current sub-goal; and
  updating the second RL agent using a second reward issued by the computer game environment based on the performance of the second RL agent attempting to achieve said current sub-goal.

* * * * *